(12) United States Patent
Maaninen

(10) Patent No.: US 9,743,103 B1
(45) Date of Patent: *Aug. 22, 2017

(54) ADVANCED MOTION ESTIMATION

(71) Applicant: GOOGLE INC., Mountain View, CA (US)

(72) Inventor: Juha Pekka Maaninen, Oulu (FI)

(73) Assignee: GOOGLE INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/095,583

(22) Filed: Apr. 11, 2016

Related U.S. Application Data

(63) Continuation of application No. 13/929,120, filed on Jun. 27, 2013, now Pat. No. 9,313,493.

(51) Int. Cl.
*H04N 19/00* (2014.01)
*H04N 19/10* (2014.01)
*H04N 19/52* (2014.01)
*H04N 19/152* (2014.01)
*H04N 19/176* (2014.01)

(52) U.S. Cl.
CPC ............ *H04N 19/52* (2014.11); *H04N 19/10* (2014.11); *H04N 19/176* (2014.11)

(58) Field of Classification Search
None
See application file for complete search history.

(56) References Cited

U.S. PATENT DOCUMENTS

| | | | | |
|---|---|---|---|---|
| 2012/0170645 A1* | 7/2012 | Chien | .................... | H04N 19/46 375/240.02 |
| 2012/0230413 A1* | 9/2012 | Lou | ........................ | H04N 19/46 375/240.16 |
| 2013/0177081 A1* | 7/2013 | Chen | ...................... | H04N 19/80 375/240.16 |
| 2013/0301704 A1* | 11/2013 | Srinivasan | ........... | H04N 19/136 375/240.02 |
| 2014/0233634 A1* | 8/2014 | Alshina | ................ | H04N 19/176 375/240.02 |
| 2016/0088305 A1* | 3/2016 | Oh | ........................ | H04N 19/30 375/240.02 |

OTHER PUBLICATIONS

Hakkennes et al., "Hardwaired Paeth Codec for Portable Network Graphics (PNG)", Proceedings of the 25th IEEE EUROMICRO Conference, Sep. 1999, pp. 1-8.*

* cited by examiner

*Primary Examiner* — Reza Aghevli
(74) *Attorney, Agent, or Firm* — Young Basile Hanlon & MacFarlane, P.C.

(57) ABSTRACT

Encoding and decoding using advanced motion estimation may include encoding a video stream including a plurality of frames by generating a first encoded frame based on a first frame from the plurality of frames, generating a first reconstructed frame based on the first encoded frame, generating reference frame index information based on the first reconstructed frame, generating an encoded reference frame based on the first reconstructed frame, generating a second reconstructed reference frame based on the encoded reference frame, and generating a second encoded frame based on a second frame from the plurality of frames, the reference frame index information, and the second reconstructed reference frame.

20 Claims, 17 Drawing Sheets

```
entropy_mode_flag                                           Type = u(1)
if( entropy_mode_flag == 4x4 )
{
    entropy_coding_4x4                                      Type = VLC
    entropy_coding_2x2[0] = entropy_coding_4x4
    entropy_coding_2x2[1] = entropy_coding_4x4
    entropy_coding_2x2[2] = entropy_coding_4x4
    entropy_coding_2x2[3] = entropy_coding_4x4
}
else if(entropy_mode_flag == 2x2)
{
    entropy_coding_2x2[0]                                   Type = VLC
    entropy_coding_2x2[1]                                   Type = VLC
    entropy_coding_2x2[2]                                   Type = VLC
    entropy_coding_2x2[3]                                   Type = VLC
}
for( b = 0 ; b < 4 ; ++b )
{
    if(entropy_coding_2x2[b] <> zero)
    {
        for( p = 0 ; p < 4 ; ++p )
        {
            pixel_residual[b][p]                            Type = VLC
        }
    }
}
```

*FIG. 10*

```
if( M == 0)
    coding_scheme = zero
else if ( M == 1 )
    coding_scheme = one
else if ( M <= 3 )
    coding_scheme = two
else if ( M <= 7 )
    coding_scheme = threebit
else if ( M <= 15 )
    coding_scheme = fourbit
else if ( M <= 31 )
    coding_scheme = fivebit
else if ( M <= 63 )
    coding_scheme = sixbit
else
    coding_scheme = full
endif
```

ADVANCED MOTION ESTIMATION

CROSS-REFERENCE TO RELATED APPLICATION(S)

This application is a continuation of U.S. patent application Ser. No. 13/929,120, filed on Jun. 27, 2013, which is incorporated herein by reference in its entirety.

BACKGROUND

Digital video can be used, for example, for remote business meetings via video conferencing, high definition video entertainment, video advertisements, or sharing of user-generated videos. Due to the large amount of data involved in video data, high performance compression is needed for transmission and storage. Accordingly, it would be advantageous to provide high resolution video transmitted over communications channels having limited bandwidth.

SUMMARY

This application relates to encoding and decoding of video stream data for transmission or storage. Disclosed herein are aspects of systems, methods, and apparatuses for encoding and decoding using advanced motion estimation.

An aspect is a method for performing advanced motion estimation, which may include encoding a video stream including a plurality of frames by generating a first encoded frame based on a first frame from the plurality of frames, generating a first reconstructed frame based on the first encoded frame, generating reference frame index information based on the first reconstructed frame, generating an encoded reference frame based on the first reconstructed frame, generating a second reconstructed reference frame based on the encoded reference frame, and generating a second encoded frame based on a second frame from the plurality of frames, the reference frame index information, and the second reconstructed reference frame.

Another aspect is a method for performing advanced motion estimation, which may include encoding a video stream including a plurality of frames by generating a first encoded frame based on a first frame from the plurality of frames, generating a first reconstructed frame based on the first encoded frame, generating reference frame index information based on the first reconstructed frame, generating a losslessly encoded reference frame based on the first reconstructed frame, storing the losslessly encoded reference frame in an external memory, and generating a second encoded frame based on a second frame from the plurality of frames, wherein the second frame from the plurality of frames includes a plurality of blocks. Generating the second encoded frame may include, identifying a current block from the plurality of blocks of the second frame, generating current block index information based on the current block, generating a block motion estimation partition list based on the reference frame index information and the current block index information, generating a portion of a reconstructed reference frame based on a portion of the losslessly encoded reference frame retrieved from the external memory, generating a pixel motion estimation partition list based on the block motion estimation partition list and the portion of the second reconstructed reference frame, generating a portion of a sub-pixel interpolated reconstructed reference frame based on the portion of the reconstructed reference frame, and generating a sub-pixel motion vector based on the pixel motion estimation partition list and the portion of the sub-pixel interpolated reconstructed reference frame.

Another aspect is a method for performing advanced motion estimation, which may include encoding a video stream including a plurality of frames by generating an encoded frame based on a frame from the plurality of frames, wherein the frame from the plurality of frames includes a plurality of blocks. Generating the encoded frame may include identifying a current block from the plurality of blocks of the frame, generating current block index information based on the current block, generating a block-resolution motion vector for the current block based on the current block index information and reference frame index information associated with a losslessly encoded reference frame, generating a portion of a reconstructed reference frame based on a portion of the losslessly encoded reference frame retrieved from an external memory, caching the portion of the reconstructed reference frame in an internal memory, generating a pixel-resolution motion vector based on the block-resolution motion vector and the cached portion of the reconstructed reference frame, and generating a sub-pixel motion vector based on the pixel-resolution motion vector and sub-pixel information interpolated based on the cached portion of the reconstructed reference frame.

Variations in these and other aspects will be described in additional detail hereafter.

BRIEF DESCRIPTION OF THE DRAWINGS

The description herein makes reference to the accompanying drawings wherein like reference numerals refer to like parts throughout the several views, and wherein:

FIG. 8 is a diagram of an example of indexing with overlapping blocks in accordance with implementations of this disclosure;

FIG. 9 is a diagram of an example of alternating position indexing in accordance with implementations of this disclosure;

FIG. 10 is a diagram of an example of entropy coding modes in accordance with implementations of this disclosure;

FIG. 11 is a diagram of an example of determining an entropy coding scheme in accordance with implementations of this disclosure;

FIG. 15 is a diagram of an example of a prediction search window in accordance with implementations of this disclosure;

FIG. 16 is a diagram of an example of an index information search window in accordance with implementations of this disclosure;

DETAILED DESCRIPTION

Figure 1:
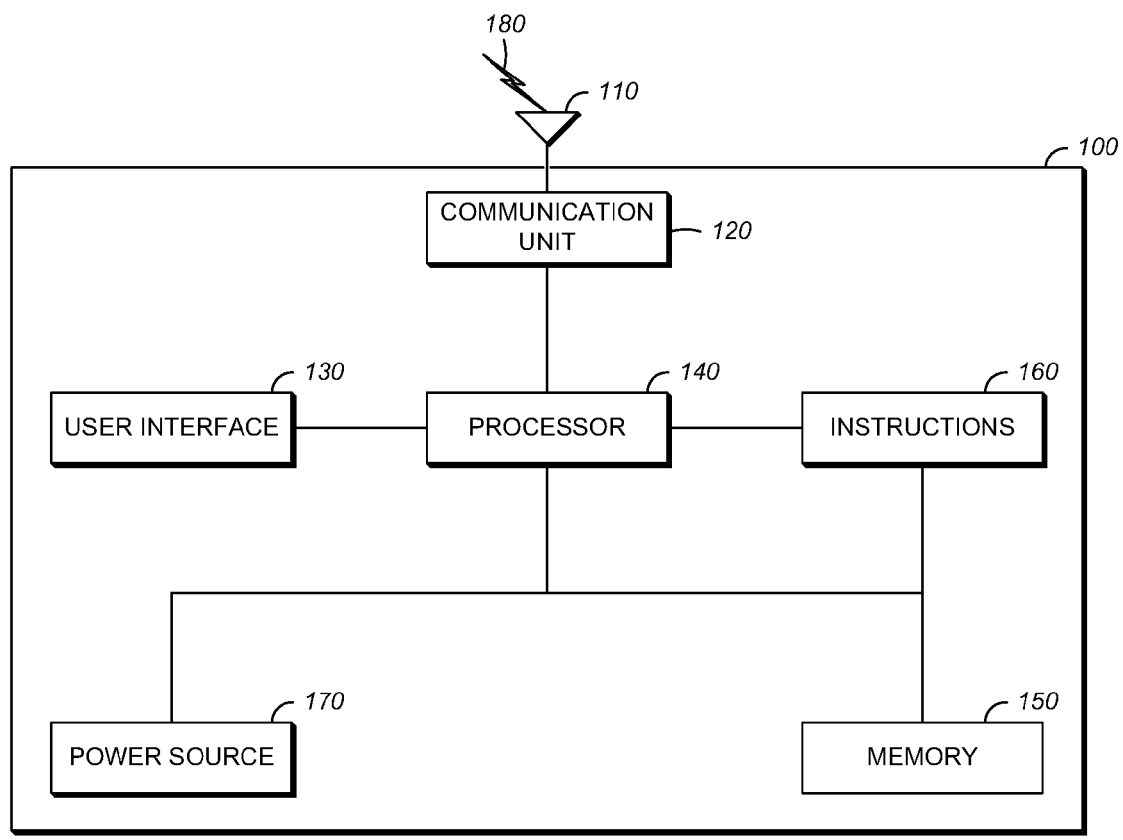
FIG. 1 is a diagram of a computing device in accordance with implementations of this disclosure.

Digital video may be used for various purposes including, for example, remote business meetings via video conferencing, high definition video entertainment, video advertisements, and sharing of user-generated videos. Digital video streams may represent video using a sequence of frames or images. Each frame can include a number of blocks, which may include information indicating pixel attributes, such as color values or brightness. Transmission and storage of video can use significant computing or communications resources. Compression and other coding techniques may be used to reduce the amount of data in video streams.

Encoding a video stream, or a portion thereof, such as a frame or a block, can include using temporal and spatial similarities in the video stream to improve coding efficiency. Video encoding may include using prediction to generate predicted pixel values in a frame based on similarities between pixels. One form of prediction is inter-prediction, which can include predicting values for a current block based on values of reference blocks which correspond to spatially and temporally proximal blocks in one or more previously encoded and decoded reference frames. Inter-prediction may include performing motion estimation, which may include searching one or more reference frames to find a closest match for a block of pixels of a current frame. Some implementations of motion estimation may not scale well, may utilize significant resources, may not expand well, and may have limited searching capabilities.

For example, the busload or bandwidth utilization of motion estimation may be high. For example, motion estimation for ultra-high resolution video, such as 4K video, which may include 3840×2160 pixels per frame, at 30 frames per second (fps) may utilize a bandwidth of approximately three gigabits per second (3 Gbit/s) per reference frame, which, considering latency and external memory power consumption, may exceed the capabilities of many decoding devices, and may limit the number of reference frames the encoder can use, which may reduce the compression efficiency of the encoder. In some implementations, the search area, such as the vertical search area of motion estimation may be limited. For example, motion estimation for high resolution video, such as 1080p video, which may include 1920×1080 pixels per frame, may include efficiently searching using a search area of, for example, 256×64 pixels. In another example, a search area of 256×64 pixels may be inefficient for 4K video, and may reduce compression efficiency, such as for video containing medium-to-fast moving objects or panning. Increasing the search area used for searching 1080p video proportionally for 4K video may quadruple the internal memory utilization on the encoder chip, and may increase encoder cost, power consumption, and size. In some implementations, motion estimation may not support block sub-partitioning, and some block sizes, such as block sizes other than 16×16 may be constrained to deviate by one pixel or less.

Implementations of advanced motion estimation may be used to efficiently encode video, such as ultra-high resolution video. For example, implementations of advanced motion estimation may include efficiently encoding block sizes, such as block sizes from 64×64 to 4×4, without restrictions on motion vector differences between blocks. Implementations of advanced motion estimation may include efficiently searching relatively large search areas, and may utilize relatively few resources such as bandwidth and internal memory.

In some implementations, advanced motion estimation may include generating reference frame data and coding one or more frames based on the reference frame data. In some implementations, generating the reference frame data may include generating index information for the reference frame and losslessly encoding the reference frame. In some implementations, the losslessly encoded reference frame data, the reference frame index information, or both, may be stored in a memory, such as an external memory. In some implementations, coding one or more frames based on the reference frame data may include generating index information for a current frame, performing block motion estimation based on the index information for the current frame and the reference frame index information, generating and caching a reconstructed reference frame, or a portion thereof, based on the losslessly encoded reference frame, performing pixel motion estimation based on the block motion estimation and the cached reconstructed reference frame, and performing sub-pixel motion estimation based on the pixel motion estimation and the cached reconstructed reference frame. In some implementations, advanced motion estimation may improve upon the resource utilization, expandability, and vertical search ability of motion estimation. For example, busload may be reduced; block sizes larger than 16×16 and a relatively large vertical search area may be supported; and memory utilization, such as on-chip SRAM size, may be minimized using, for example, adaptive prefetching of blocks.

FIG. 1 is a diagram of a computing device 100 in accordance with implementations of this disclosure. A computing device 100 can include a communication interface 110, a communication unit 120, a user interface (UI) 130, a processor 140, a memory 150, instructions 160, a power source 170, or any combination thereof. As used herein, the term "computing device" includes any unit, or combination of units, capable of performing any method, or any portion or portions thereof, disclosed herein.

The computing device 100 may be a stationary computing device, such as a personal computer (PC), a server, a workstation, a minicomputer, or a mainframe computer; or a mobile computing device, such as a mobile telephone, a personal digital assistant (PDA), a laptop, or a tablet PC. Although shown as a single unit, any one or more element of the communication device 100 can be integrated into any number of separate physical units. For example, the UI 130 and processor 140 can be integrated in a first physical unit and the memory 150 can be integrated in a second physical unit.

The communication interface 110 can be a wireless antenna, as shown, a wired communication port, such as an Ethernet port, an infrared port, a serial port, or any other wired or wireless unit capable of interfacing with a wired or wireless electronic communication medium 180.

The communication unit 120 can be configured to transmit or receive signals via a wired or wireless medium 180. For example, as shown, the communication unit 120 is operatively connected to an antenna configured to communicate via wireless signals. Although not explicitly shown in FIG. 1, the communication unit 120 can be configured to transmit, receive, or both via any wired or wireless communication medium, such as radio frequency (RF), ultra violet (UV), visible light, fiber optic, wire line, or a combination thereof. Although FIG. 1 shows a single communication unit 120 and a single communication interface 110, any number of communication units and any number of communication interfaces can be used.

The UI 130 can include any unit capable of interfacing with a user, such as a virtual or physical keypad, a touchpad, a display, a touch display, a speaker, a microphone, a video camera, a sensor, or any combination thereof. The UI 130 can be operatively coupled with the processor, as shown, or with any other element of the communication device 100, such as the power source 170. Although shown as a single unit, the UI 130 may include one or more physical units. For example, the UI 130 may include an audio interface for performing audio communication with a user, and a touch display for performing visual and touch based communication with the user. Although shown as separate units, the communication interface 110, the communication unit 120, and the UI 130, or portions thereof, may be configured as a combined unit. For example, the communication interface 110, the communication unit 120, and the UI 130 may be implemented as a communications port capable of interfacing with an external touchscreen device.

The processor 140 can include any device or system capable of manipulating or processing a signal or other information now-existing or hereafter developed, including optical processors, quantum processors, molecular processors, or a combination thereof. For example, the processor 140 can include a general purpose processor, a special purpose processor, a conventional processor, a digital signal processor (DSP), a plurality of microprocessors, one or more microprocessor in association with a DSP core, a controller, a microcontroller, an Application Specific Integrated Circuit (ASIC), a Field Programmable Gate Array (FPGA), a programmable logic array, programmable logic controller, microcode, firmware, any type of integrated circuit (IC), a state machine, or any combination thereof. As used herein, the term "processor" includes a single processor or multiple processors. The processor can be operatively coupled with the communication interface 110, communication unit 120, the UI 130, the memory 150, the instructions 160, the power source 170, or any combination thereof.

The memory 150 can include any non-transitory computer-usable or computer-readable medium, such as any tangible device that can, for example, contain, store, communicate, or transport the instructions 160, or any information associated therewith, for use by or in connection with the processor 140. The non-transitory computer-usable or computer-readable medium can be, for example, a solid state drive, a memory card, removable media, a read only memory (ROM), a random access memory (RAM), any type of disk including a hard disk, a floppy disk, an optical disk, a magnetic or optical card, an application specific integrated circuits (ASICs), or any type of non-transitory media suitable for storing electronic information, or any combination thereof. The memory 150 can be connected to, for example, the processor 140 through, for example, a memory bus (not explicitly shown).

The instructions 160 can include directions for performing any method, or any portion or portions thereof, disclosed herein. The instructions 160 can be realized in hardware, software, or any combination thereof. For example, the instructions 160 may be implemented as information stored in the memory 150, such as a computer program, that may be executed by the processor 140 to perform any of the respective methods, algorithms, aspects, or combinations thereof, as described herein. The instructions 160, or a portion thereof, may be implemented as a special purpose processor, or circuitry, that can include specialized hardware for carrying out any of the methods, algorithms, aspects, or combinations thereof, as described herein. Portions of the instructions 160 can be distributed across multiple processors on the same machine or different machines or across a network such as a local area network, a wide area network, the Internet, or a combination thereof.

The power source 170 can be any suitable device for powering the communication device 110. For example, the power source 170 can include a wired power source; one or more dry cell batteries, such as nickel-cadmium (NiCd), nickel-zinc (NiZn), nickel metal hydride (NiMH), lithium-ion (Li-ion); solar cells; fuel cells; or any other device capable of powering the communication device 110. The communication interface 110, the communication unit 120, the UI 130, the processor 140, the instructions 160, the memory 150, or any combination thereof, can be operatively coupled with the power source 170.

Although shown as separate elements, the communication interface 110, the communication unit 120, the UI 130, the processor 140, the instructions 160, the power source 170, the memory 150, or any combination thereof can be integrated in one or more electronic units, circuits, or chips.

Figure 2:
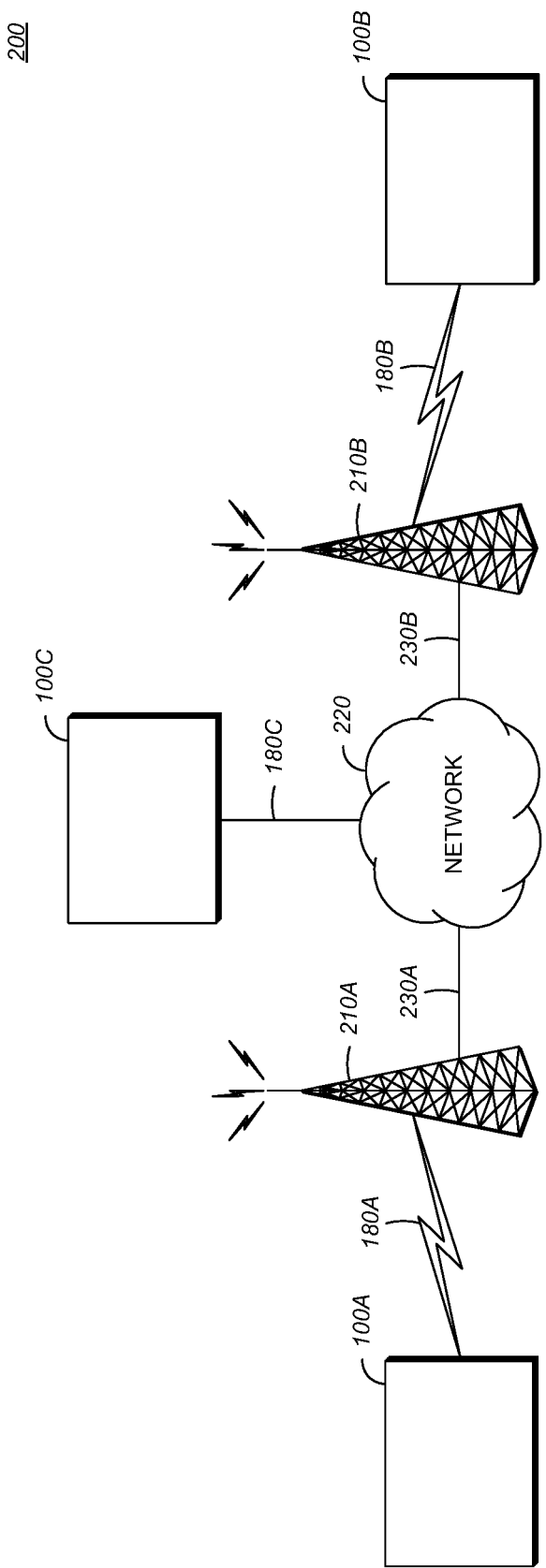
FIG. 2 is a diagram of a computing and communications system in accordance with implementations of this disclosure.

FIG. 2 is a diagram of a computing and communications system 200 in accordance with implementations of this disclosure. The computing and communications system 200 may include one or more computing and communication devices 100A/100B/100C, one or more access points 210A/210B, one or more networks 220, or a combination thereof. For example, the computing and communication system 200 can be a multiple access system that provides communication, such as voice, data, video, messaging, broadcast, or a combination thereof, to one or more wired or wireless communicating devices, such as the computing and communication devices 100A/100B/100C. Although, for simplicity, FIG. 2 shows three computing and communication devices 100A/100B/100C, two access points 210A/210B, and one network 220, any number of computing and communication devices, access points, and networks can be used.

A computing and communication device 100A/100B/100C can be, for example, a computing device, such as the computing device 100 shown in FIG. 1. For example, as shown the computing and communication devices 100A/100B may be user devices, such as a mobile computing device, a laptop, a thin client, or a smartphone, and computing and the communication device 100C may be a server, such as a mainframe or a cluster. Although the computing and communication devices 100A/100B are described as user devices, and the computing and communication device 100C is described as a server, any computing and communication device may perform some or all of the functions of a server, some or all of the functions of a user device, or some or all of the functions of a server and a user device.

Each computing and communication device 100A/100B/100C can be configured to perform wired or wireless communication. For example, a computing and communication device 100A/100B/100C can be configured to transmit or receive wired or wireless communication signals and can include a user equipment (UE), a mobile station, a fixed or mobile subscriber unit, a cellular telephone, a personal computer, a tablet computer, a server, consumer electronics, or any similar device. Although each computing and communication device 100A/100B/100C is shown as a single unit, a computing and communication device can include any number of interconnected elements.

Each access point 210A/210B can be any type of device configured to communicate with a computing and communication device 100A/100B/100C, a network 220, or both via wired or wireless communication links 180A/180B/180C. For example, an access point 210A/210B can include a base station, a base transceiver station (BTS), a Node-B, an enhanced Node-B (eNode-B), a Home Node-B (HNode-B), a wireless router, a wired router, a hub, a relay, a switch, or any similar wired or wireless device. Although each access point 210A/210B is shown as a single unit, an access point can include any number of interconnected elements.

The network 220 can be any type of network configured to provide services, such as voice, data, applications, voice over internet protocol (VoIP), or any other communications protocol or combination of communications protocols, over a wired or wireless communication link. For example, the network 220 can be a local area network (LAN), wide area network (WAN), virtual private network (VPN), a mobile or cellular telephone network, the Internet, or any other means of electronic communication. The network can use a communication protocol, such as the transmission control protocol (TCP), the user datagram protocol (UDP), the internet protocol (IP), the real-time transport protocol (RTP) the Hyper Text Transport Protocol (HTTP), or a combination thereof.

The computing and communication devices 100A/100B/100C can communicate with each other via the network 220 using one or more a wired or wireless communication links, or via a combination of wired and wireless communication links. For example, as shown the computing and communication devices 100A/100B can communicate via wireless communication links 180A/180B, and computing and communication device 100C can communicate via a wired communication link 180C. Any of the computing and communication devices 100A/100B/100C may communicate using any wired or wireless communication link, or links. For example, a first computing and communication device 100A can communicate via a first access point 210A using a first type of communication link, a second computing and communication device 100B can communicate via a second access point 210B using a second type of communication link, and a third computing and communication device 100C can communicate via a third access point (not shown) using a third type of communication link. Similarly, the access points 210A/210B can communicate with the network 220 via one or more types of wired or wireless communication links 230A/230B. Although FIG. 2 shows the computing and communication devices 100A/100B/100C in communication via the network 220, the computing and communication devices 100A/100B/100C can communicate with each other via any number of communication links, such as a direct wired or wireless communication link.

Other implementations of the computing and communications system 200 are possible. For example, in an implementation the network 220 can be an ad-hock network and can omit one or more of the access points 210A/210B. The computing and communications system 200 may include devices, units, or elements not shown in FIG. 2. For example, the computing and communications system 200 may include many more communicating devices, networks, and access points.

Figure 3:
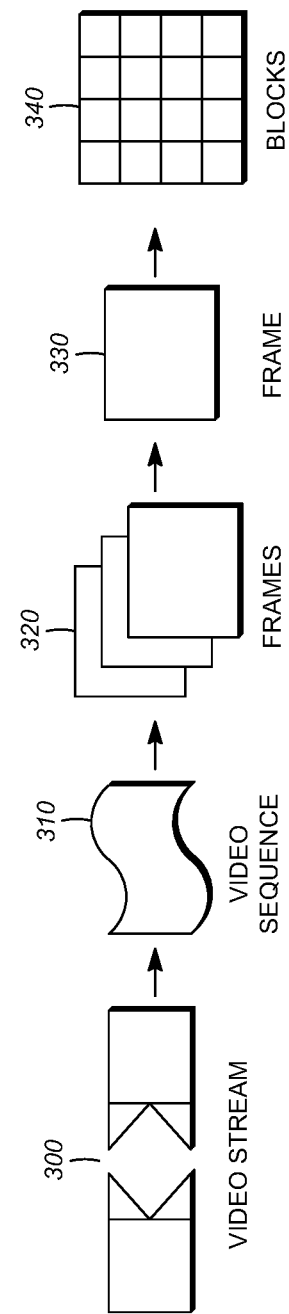
FIG. 3 is a diagram of a video stream for use in encoding and decoding in accordance with implementations of this disclosure.

FIG. 3 is a diagram of a video stream 300 for use in encoding and decoding in accordance with implementations of this disclosure. A video stream 300, such as a video stream captured by a video camera or a video stream generated by a computing device, may include a video sequence 310. The video sequence 310 may include a sequence of adjacent frames 320. Although three adjacent frames 320 are shown, the video sequence 310 can include any number of adjacent frames 320. Each frame 330 from the adjacent frames 320 may represent a single image from the video stream. A frame 330 may include blocks 340. Although not shown in FIG. 3, a block can include pixels. For example, a block can include a 16×16 group of pixels, an 8×8 group of pixels, an 8×16 group of pixels, or any other group of pixels. Unless otherwise indicated herein, the term 'block' can include a superblock, a macroblock, a segment, a slice, or any other portion of a frame. A frame, a block, a pixel, or a combination thereof can include display information, such as luminance information, chrominance information, or any other information that can be used to store, modify, communicate, or display the video stream or a portion thereof.

Figure 4:
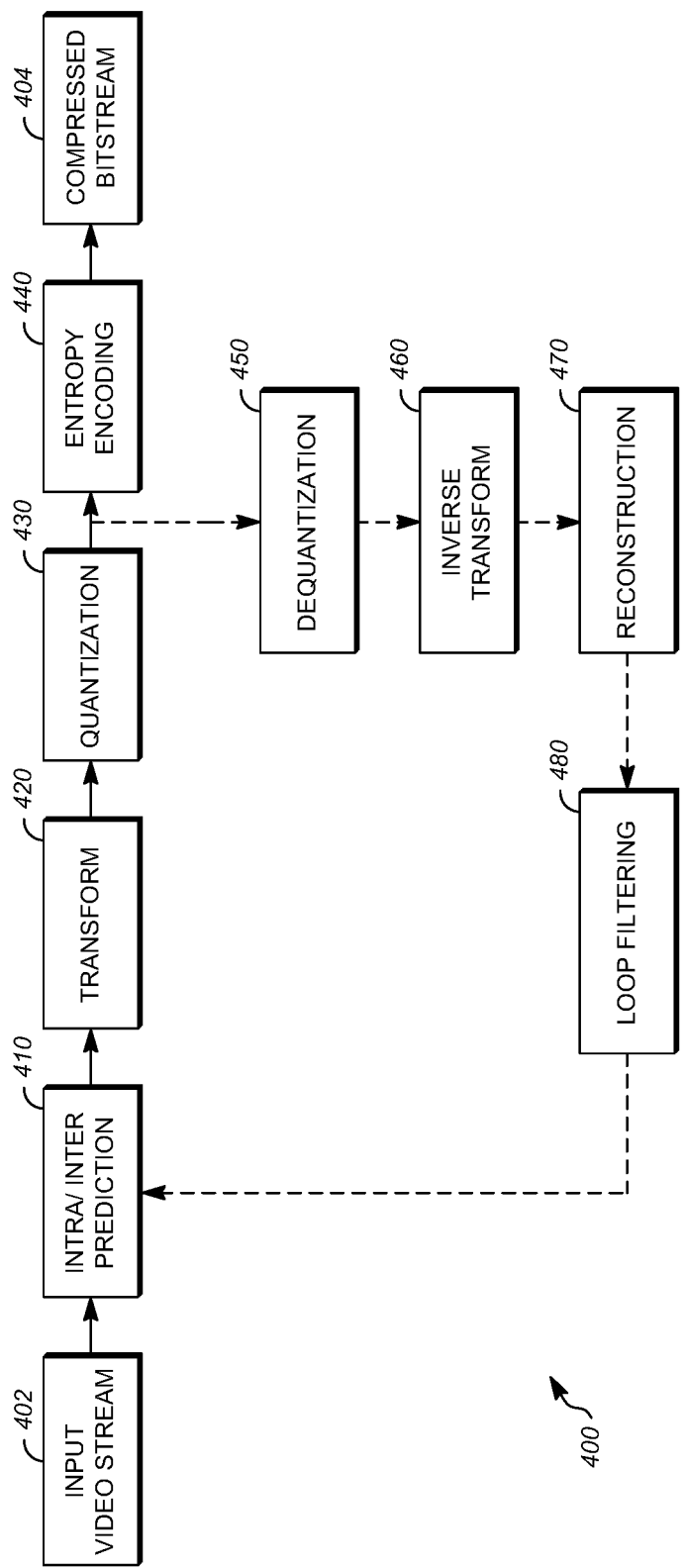
FIG. 4 is a block diagram of an encoder in accordance with implementations of this disclosure.

FIG. 4 is a block diagram of an encoder 400 in accordance with implementations of this disclosure. Encoder 400 can be implemented in a device, such as the computing device 100 shown in FIG. 1 or the computing and communication devices 100A/100B/100C shown in FIG. 2, as, for example, a computer software program stored in a data storage unit, such as the memory 150 shown in FIG. 1. The computer software program can include machine instructions that may be executed by a processor, such as the processor 160 shown in FIG. 1, and may cause the device to encode video data as described herein. The encoder 400 can be implemented as specialized hardware included, for example, in computing device 100.

The encoder 400 can encode an input video stream 402, such as the video stream 300 shown in FIG. 3 to generate an encoded (compressed) bitstream 404. In some implementations, the encoder 400 may include a forward path for generating the compressed bitstream 404. The forward path may include an intra/inter prediction unit 410, a transform unit 420, a quantization unit 430, an entropy encoding unit 440, or any combination thereof. In some implementations, the encoder 400 may include a reconstruction path (indicated by the broken connection lines) to reconstruct a frame for encoding of further blocks. The reconstruction path may include a dequantization unit 450, an inverse transform unit 460, a reconstruction unit 470, a loop filtering unit 480, or any combination thereof. Other structural variations of the encoder 400 can be used to encode the video stream 402.

For encoding the video stream 402, each frame within the video stream 402 can be processed in units of blocks. Thus, a current block may be identified from the blocks in a frame, and the current block may be encoded.

At the intra/inter prediction unit 410, the current block can be encoded using either intra-frame prediction, which may be within a single frame, or inter-frame prediction, which may be from frame to frame. Intra-prediction may include generating a prediction block from samples in the current frame that have been previously encoded and reconstructed. Inter-prediction may include generating a prediction block from samples in one or more previously constructed reference frames. Generating a prediction block for a current block in a current frame may include performing motion estimation to generate a motion vector indicating an appropriate reference block in the reference frame.

The intra/inter prediction unit 410 may subtract the prediction block from the current block (raw block) to produce a residual block. The transform unit 420 may perform a block-based transform, which may include transforming the residual block into transform coefficients in, for example, the frequency domain. Examples of block-based transforms include the Karhunen-Loève Transform (KLT), the Discrete Cosine Transform (DCT), and the Singular Value Decomposition Transform (SVD). In an example, the DCT may include transforming a block into the frequency domain. The DCT may include using transform coefficient values based on spatial frequency, with the lowest frequency (i.e. DC) coefficient at the top-left of the matrix and the highest frequency coefficient at the bottom-right of the matrix.

The quantization unit 430 may convert the transform coefficients into discrete quantum values, which may be referred to as quantized transform coefficients or quantization levels. The quantized transform coefficients can be entropy encoded by the entropy encoding unit 440 to produce entropy-encoded coefficients. Entropy encoding can include using a probability distribution metric. The entropy-encoded coefficients and information used to decode the block, which may include the type of prediction used, motion vectors, and quantizer values, can be output to the compressed bitstream 404. The compressed bitstream 404 can be formatted using various techniques, such as run-length encoding (RLE) and zero-run coding.

Figure 5:
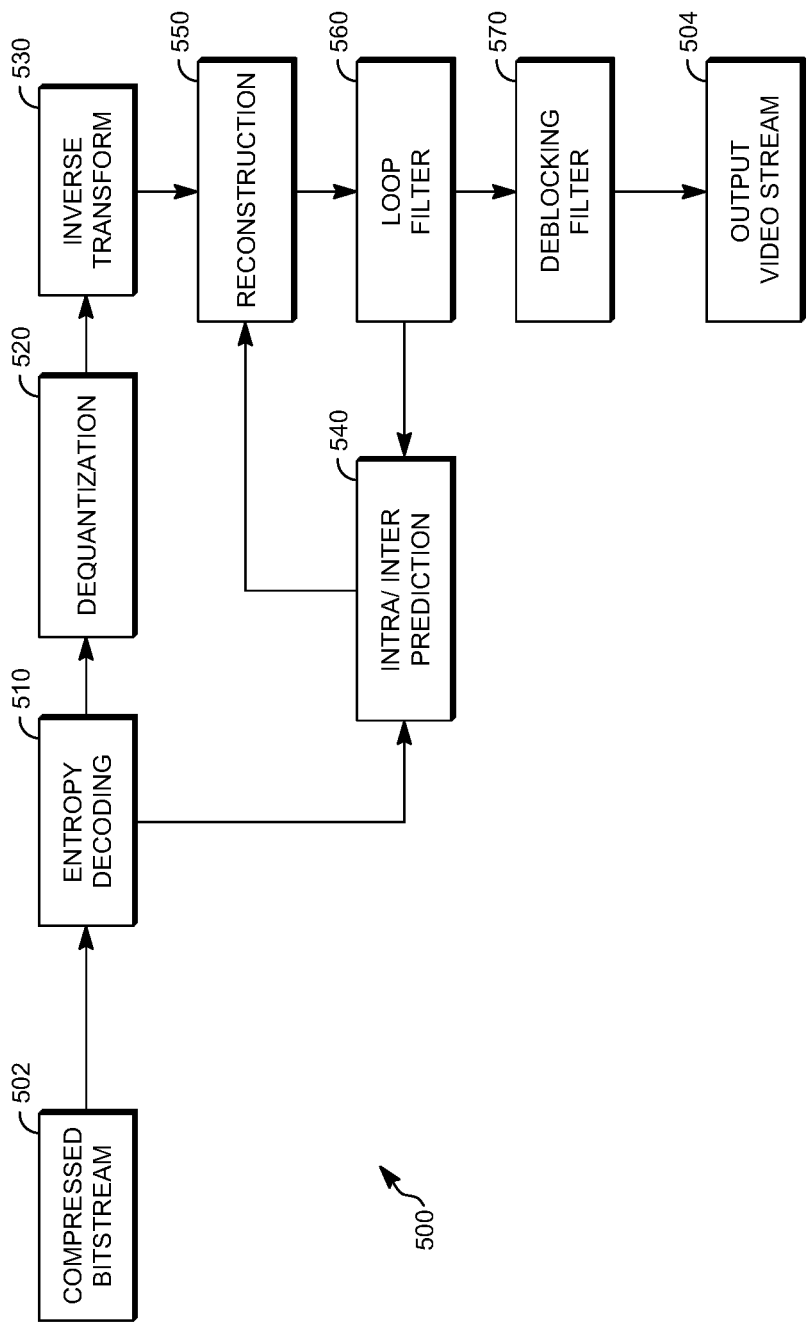
FIG. 5 is a block diagram of a decoder in accordance with implementations of this disclosure.

The reconstruction path can be used to maintain reference frame synchronization between the encoder 400 and a corresponding decoder, such as the decoder 500 shown in FIG. 5. The reconstruction path may be similar to the decoding process discussed below, and may include dequantizing the quantized transform coefficients at the dequantization unit 450 and inverse transforming the dequantized transform coefficients at the inverse transform unit 460 to produce a derivative residual block. The reconstruction unit 470 may add the prediction block generated by the intra/inter prediction unit 410 to the derivative residual block to create a reconstructed block. The loop filtering unit 480 can be applied to the reconstructed block to reduce distortion, such as blocking artifacts.

Other variations of the encoder 400 can be used to encode the compressed bitstream 404. For example, a non-transform based encoder 400 can quantize the residual block directly without the transform unit 420. In some implementations, the quantization unit 430 and the dequantization unit 450 may be combined into a single unit.

FIG. 5 is a block diagram of a decoder 500 in accordance with implementations of this disclosure. The decoder 500 can be implemented in a device, such as the computing device 100 shown in FIG. 1 or the computing and communication devices 100A/100B/100C shown in FIG. 2, as, for example, a computer software program stored in a data storage unit, such as the memory 150 shown in FIG. 1. The computer software program can include machine instructions that may be executed by a processor, such as the processor 160 shown in FIG. 1, and may cause the device to decode video data as described herein. The decoder 400 can be implemented as specialized hardware included, for example, in computing device 100.

The decoder 500 may receive a compressed bitstream 502, such as the compressed bitstream 404 shown in FIG. 4, and may decode the compressed bitstream 502 to generate an output video stream 504. The decoder 500 may include an entropy decoding unit 510, a dequantization unit 520, an inverse transform unit 530, an intra/inter prediction unit 540, a reconstruction unit 550, a loop filtering unit 560, a deblocking filtering unit 570, or any combination thereof. Other structural variations of the decoder 500 can be used to decode the compressed bitstream 502.

The entropy decoding unit 510 may decode data elements within the compressed bitstream 502 using, for example, Context Adaptive Binary Arithmetic Decoding, to produce a set of quantized transform coefficients. The dequantization unit 520 can dequantize the quantized transform coefficients, and the inverse transform unit 530 can inverse transform the dequantized transform coefficients to produce a derivative residual block, which may correspond with the derivative residual block generated by the inverse transformation unit 460 shown in FIG. 4. Using header information decoded from the compressed bitstream 502, the intra/inter prediction unit 540 may generate a prediction block corresponding to the prediction block created in the encoder 400. At the reconstruction unit 550, the prediction block can be added to the derivative residual block to create a reconstructed block. The loop filtering unit 560 can be applied to the reconstructed block to reduce blocking artifacts. The deblocking filtering unit 570 can be applied to the reconstructed block to reduce blocking distortion, and the result may be output as the output video stream 504.

Other variations of the decoder 500 can be used to decode the compressed bitstream 502. For example, the decoder 500 can produce the output video stream 504 without the deblocking filtering unit 570.

Figure 6:
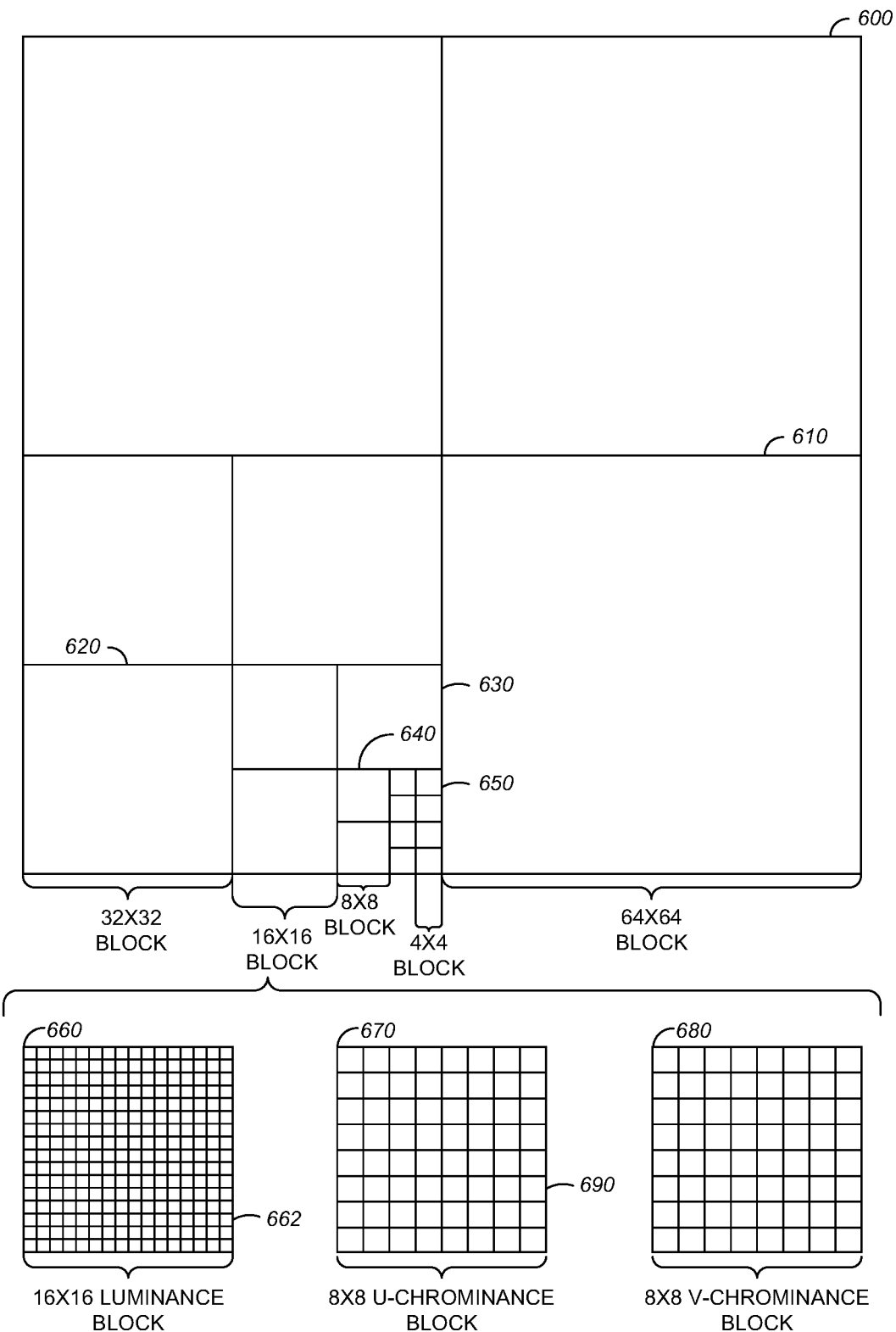
FIG. 6 is a block diagram of a representation of a portion of a frame in accordance with implementations of this disclosure.

FIG. 6 is a block diagram of a representation of a portion 600 of a frame, such as the frame 330 shown in FIG. 3, in accordance with implementations of this disclosure. As shown, the portion 600 of the frame includes four 64×64 blocks 610, which may be referred to as superblocks, in two rows and two columns in a matrix or Cartesian plane. In some implementations, a superblock may be a basic or maximum coding unit. Each superblock may include four 32×32 blocks 620. Each 32×32 block may include four 16×16 blocks 630. Each 16×16 block may include four 8×8 blocks 640. Each 8×8 block 640 may include four 4×4 blocks 650. Each 4×4 block 650 may include 16 pixels, which may be represented in four rows and four columns in each respective block in the Cartesian plane or matrix. The pixels may include information representing an image captured in the frame, such as luminance information, color information, and location information. In some implementations, a block, such as a 16×16 pixel block as shown, may include a luminance block 660, which may include may include luminance pixels 662; and two chrominance blocks 670/680, such as a U or Cb chrominance block 670, and a V or Cr chrominance block 680. The chrominance blocks 670/680 may include chrominance pixels 690. For example, the luminance block 660 may include 16×16 luminance pixels 662 and each chrominance block 670/680 may include 8×8 chrominance pixels 690 as shown. Although one arrangement of blocks is shown, any arrangement may be used. Although FIG. 6 shows N×N blocks, in some implementations, N×M blocks may be used. For example, 32×64 blocks, 64×32 blocks, 16×32 blocks, 32×16 blocks, or any other size blocks may be used. In some implementations, N×2N blocks, 2N×N blocks, or a combination thereof may be used.

In some implementations, video coding may include ordered block-level coding. Ordered block-level coding may include coding blocks of a frame in an order, such as raster-scan order, wherein blocks may be identified and processed starting with a block in the upper left corner of the frame, or portion of the frame, and proceeding along rows from left to right and from the top row to the bottom row, identifying each block in turn for processing. For example, the superblock in the top row and left column of a frame may be the first block coded and the superblock immediately to the right of the first block may be the second block coded. The second row from the top may be the second row coded, such that the superblock in the left column of the second row may be coded after the superblock in the rightmost column of the first row.

In some implementations, coding a block may include using quad-tree coding, which may include coding smaller block units with a block in raster-scan order. For example, the 64×64 superblock shown in the bottom left corner of the portion of the frame shown in FIG. 6, may be coded using quad-tree coding wherein the top left 32×32 block may be coded, then the top right 32×z32 block may be coded, then the bottom left 32×32 block may be coded, and then the bottom right 32×32 block may be coded. Each 32×32 block may be coded using quad-tree coding wherein the top left 16×16 block may be coded, then the top right 16×16 block may be coded, then the bottom left 16×16 block may be coded, and then the bottom right 16×16 block may be coded. Each 16×16 block may be coded using quad-tree coding wherein the top left 8×8 block may be coded, then the top right 8×8 block may be coded, then the bottom left 8×8 block may be coded, and then the bottom right 8×8 block may be coded. Each 8×8 block may be coded using quad-tree coding wherein the top left 4×4 block may be coded, then the top right 4×4 block may be coded, then the bottom left 4×4 block may be coded, and then the bottom right 4×4 block may be coded. In some implementations, 8×8 blocks may be omitted for a 16×16 block, and the 16×16 block may be coded using quad-tree coding wherein the top left 4×4 block may be coded, then the other 4×4 blocks in the 16×16 block may be coded in raster-scan order.

In some implementations, video coding may include compressing the information included in an original, or input, frame by, for example, omitting some of the information in the original frame from a corresponding encoded frame. For example, coding may include reducing spectral redundancy, reducing spatial redundancy, reducing temporal redundancy, or a combination thereof.

In some implementations, reducing spectral redundancy may include using a color model based on a luminance component (Y) and two chrominance components (U and V or Cb and Cr), which may be referred to as the YUV or YCbCr color model, or color space. Using the YUV color model may include using a relatively large amount of information to represent the luminance component of a portion of a frame, and using a relatively small amount of information to represent each corresponding chrominance component for the portion of the frame. For example, a portion of a frame may be represented by a high resolution luminance component, which may include a 16×16 block of pixels, and by two lower resolution chrominance components, each of which represents the portion of the frame as an 8×8 block of pixels. A pixel may indicate a value, for example, a value in the range from 0 to 255, and may be stored or transmitted using, for example, eight bits. Although this disclosure is described in reference to the YUV color model, any color model may be used.

In some implementations, reducing spatial redundancy may include transforming a block into the frequency domain using, for example, a discrete cosine transform (DCT). For example, a unit of an encoder, such as the transform unit 420 shown in FIG. 4, may perform a DCT using transform coefficient values based on spatial frequency.

In some implementations, reducing temporal redundancy may include using similarities between frames to encode a frame using a relatively small amount of data based on one or more reference frames, which may be previously encoded, decoded, and reconstructed frames of the video stream. For example, a block or pixel of a current frame may be similar to a spatially corresponding block or pixel of a reference frame. In some implementations, a block or pixel of a current frame may be similar to block or pixel of a reference frame at a different spatial location, and reducing temporal redundancy may include generating motion information indicating the spatial difference, or translation, between the location of the block or pixel in the current frame and corresponding location of the block or pixel in the reference frame.

In some implementations, reducing temporal redundancy may include identifying a block or pixel in a reference frame, or a portion of the reference frame, that corresponds with a current block or pixel of a current frame. For example, a reference frame, or a portion of a reference frame, which may be stored in memory, may be searched for the best block or pixel to use for encoding a current block or pixel of the current frame. For example, the search may identify the block of the reference frame for which the difference in pixel values between the reference block and the current block is minimized, and may be referred to as motion searching. In some implementations, the portion of the reference frame searched may be limited. For example, the portion of the reference frame searched, which may be referred to as the search area, may include a limited number of rows of the reference frame. In an example, identifying the reference block may include calculating a cost function, such as a sum of absolute differences (SAD), between the pixels of the blocks in the search area and the pixels of the current block.

In some implementations, the spatial difference between the location of the reference block in the reference frame and the current block in the current frame may be represented as a motion vector. The difference in pixel values between the reference block and the current block may be referred to as differential data, residual data, or as a residual block. In some implementations, generating motion vectors may be referred to as motion estimation, a pixel of a current block may be indicated based on location using Cartesian coordinates as $f_{x,y}$. Similarly, a pixel of the search area of the reference frame may be indicated based on location using Cartesian coordinates as $r_{x,y}$. A motion vector (MV) for the current block may be determined based on, for example, a SAD between the pixels of the current frame and the corresponding pixels of the reference frame.

Although advanced motion estimation is described herein with reference to matrix or Cartesian representation of a frame for clarity, a frame may be stored, transmitted, processed, or any combination thereof, in any data structure such that pixel values may be efficiently predicted for a frame or image. For example, a frame may be stored, transmitted, processed, or any combination thereof, in a two dimensional data structure such as a matrix as shown, or in a one dimensional data structure, such as a vector array. In an implementation, a representation of the frame, such as a two dimensional representation as shown, may correspond to a physical location in a rendering of the frame as an image. For example, a location in the top left corner of a block in the top left corner of the frame may correspond with a physical location in the top left corner of a rendering of the frame as an image.

Figure 7:
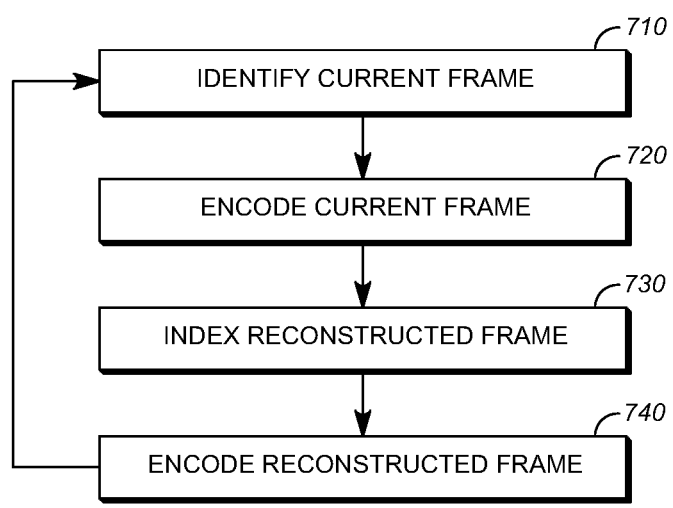
FIG. 7 is a block diagram of an example of advanced motion estimation in accordance with implementations of this disclosure.

FIG. 7 is a block diagram of an example of advanced motion estimation in accordance with implementations of this disclosure. Advanced motion estimation, or any portion thereof, can be implemented in a device, such as the computing and communication devices 100A/100B/100C shown in FIG. 2. For example, an encoder, such as the encoder 400 shown in FIG. 4, can implement advanced motion estimation, or any portion thereof, using instruction stored on a tangible, non-transitory, computer readable media, such as memory 150 shown in FIG. 1. Although not explicitly shown in FIG. 1, the device, or a portion of the device, may include an internal memory, an external memory, or both. For example, an encoder may retrieve data from an external memory and store the data in an internal memory, such as a frame buffer, for efficient access. Implementations of advanced motion estimation may include identifying a current frame at 710, encoding the current frame at 720, indexing a reconstructed frame at 730, encoding the reconstructed frame at 740, or a combination thereof.

In some implementations, a current frame may be identified at 710. For example, a frame, such as the frame 330 shown in FIG. 3, of a video stream, such as the video stream 320 shown in FIG. 3 or the video stream 402 shown in FIG. 4, may be identified as the current frame. In some implementations, identifying the current frame at 710 may include storing the current frame, or a copy of the current frame, in memory, such the memory 150 shown in FIG. 1, which may include a frame buffer. In some implementations, identifying the current frame may include retrieving the current frame from an external memory.

Figure 14:
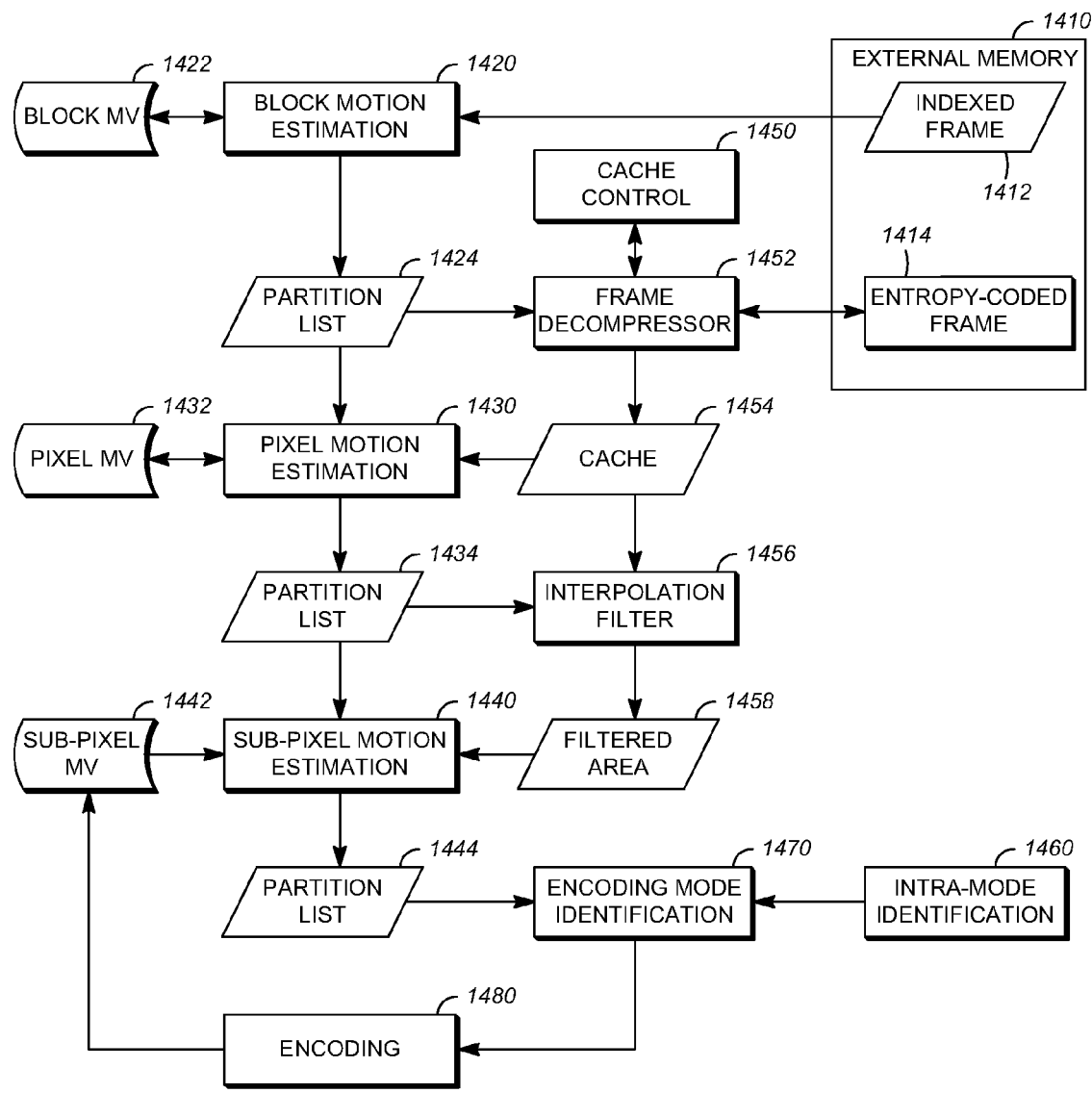
FIG. 14 is a block diagram of an example of advanced motion estimation inter-prediction in accordance with implementations of this disclosure.

In some implementations, the current frame may be encoded at 720. For example, encoding the current frame may include using ordered block-level coding, quad-tree coding, or a combination thereof. In some implementations, encoding the current frame at 720 may include identifying a coding mode, such as intra-coding or inter-coding, for coding the frame. For example, a forward path of an encoder, such as the encoder 400 shown in FIG. 4, may generate the encoded frame, and a reconstruction path of the encoder may generate the reconstructed frame. In some implementations, the current frame may be encoded using intra-coding, which may include generating an encoded frame without reference to another frame and outputting the encoded frame to an output bitstream. In some implementations, the current frame may be encoded using inter-coding, which may include generating an encoded frame with reference to a reconstructed reference frame and outputting the encoded frame to an output bitstream. In some implementations, encoding the current frame at 720 may include performing advanced motion estimation inter-prediction. For example, the coding mode identified for coding the current frame may be inter-coding and advanced motion estimation inter-prediction may be performed as shown in FIG. 14. In some implementations, encoding the current frame at 720 may include generating a reconstructed frame based on the encoded frame.

In some implementations, index information may be generated for the reconstructed frame at 730. For example, generating index information may include generating index position values for index positions, wherein each index position represents a block or group of pixels, such as a 4×4 block of pixels. In some implementations, the reconstructed frame may be used as a reference frame for predicting another frame, and index information for the reconstructed frame may be used as reference frame index information for predicting the other frame. In some implementations, the reconstructed frame may include reconstructed blocks that may each include 16×16 luminance pixels. In some implementations, a pixel may be indicated based on coordinates in the frame. For example, the pixel identifier $R_{x,y}$ may indicate the pixel at the $x^{th}$ row and the $y^{th}$ column of the reconstructed frame. In some implementations, generation of the reconstructed frame and generation of the index information for the reconstructed frame may be combined. For example, an encoder, such as the encoder 400 shown in FIG. 4, may include a reconstruction path that may generate the reconstructed frame, which may include block-wise generation of reconstructed blocks and corresponding index information.

In some implementations, generating index information for the reconstructed frame may include identifying indexing positions for the reconstructed frame. For example, an indexing position may include an L×L block of pixels, such as a 4×4 block of pixels. In some implementations, an indexing position may be identified based on coordinates in the frame of the top left pixel of the indexing position, such that the index $RI_{X,Y}$ indicates an indexing position having an upper left pixel located at row x and column y of the frame. For example, the 4×4 indexing position $RI_{0,0}$ may include the pixels $R_{0,0}$; $R_{0,1}$; $R_{0,2}$; $R_{0,3}$; $R_{1,0}$; $R_{1,1}$; $R_{1,2}$; $R_{1,3}$; $R_{2,0}$; $R_{2,1}$; $R_{2,2}$; $R_{2,3}$; $R_{3,0}$; $R_{3,1}$; $R_{3,2}$; $R_{3,3}$. In some implementations, the indexing positions may not coincide with the blocks identified for encoding and reconstructing the corresponding frame. In some implementations, the size L of the indexing positions may be based on the frame size, the coding block size, or both.

Figure 8:
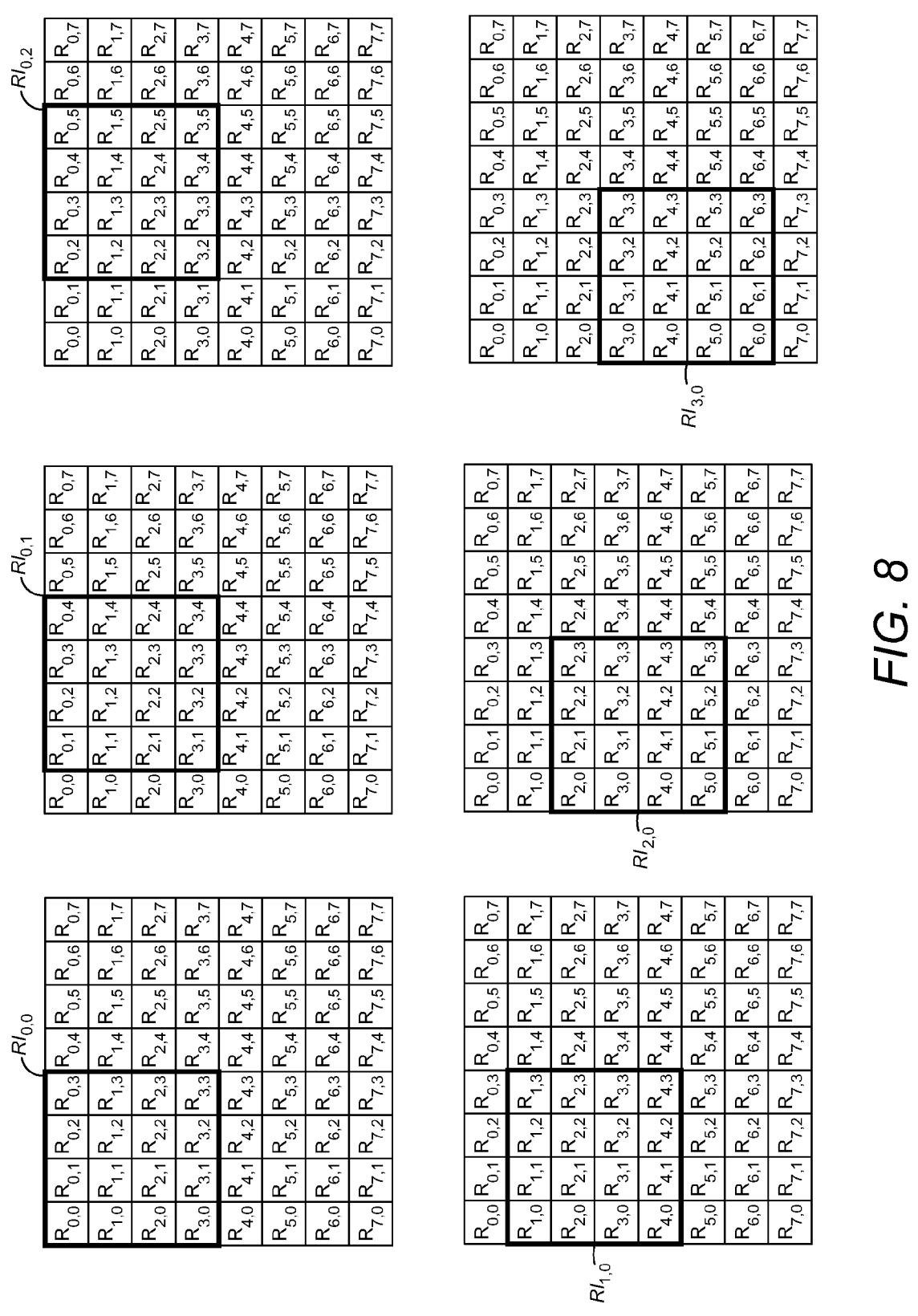

In some implementations, the indexing positions may partially overlap. For example, the 4×4 indexing position $RI_{0,1}$ may include the pixels $R_{0,1}$; $R_{0,2}$; $R_{0,3}$; $R_{0,4}$; $R_{1,1}$; $R_{1,2}$; $R_{1,3}$; $R_{1,4}$; $R_{2,1}$; $R_{2,2}$; $R_{2,3}$; $R_{2,4}$; $R_{3,1}$; $R_{3,2}$; $R_{3,3}$; $R_{3,4}$, and the 4×4 indexing position $I_{1,0}$ may include the pixels $R_{1,0}$; $R_{1,1}$; $R_{1,2}$; $R_{1,3}$; $R_{2,0}$; $R_{2,1}$; $R_{2,2}$; $R_{2,3}$; $R_{3,0}$; $R_{3,1}$; $R_{3,2}$; $R_{3,3}$; $R_{4,0}$; $R_{4,1}$; $R_{4,2}$; $R_{4,3}$. FIG. 8 is a diagram of an example of indexing with overlapping index blocks in accordance with implementations of this disclosure.

Figure 9:
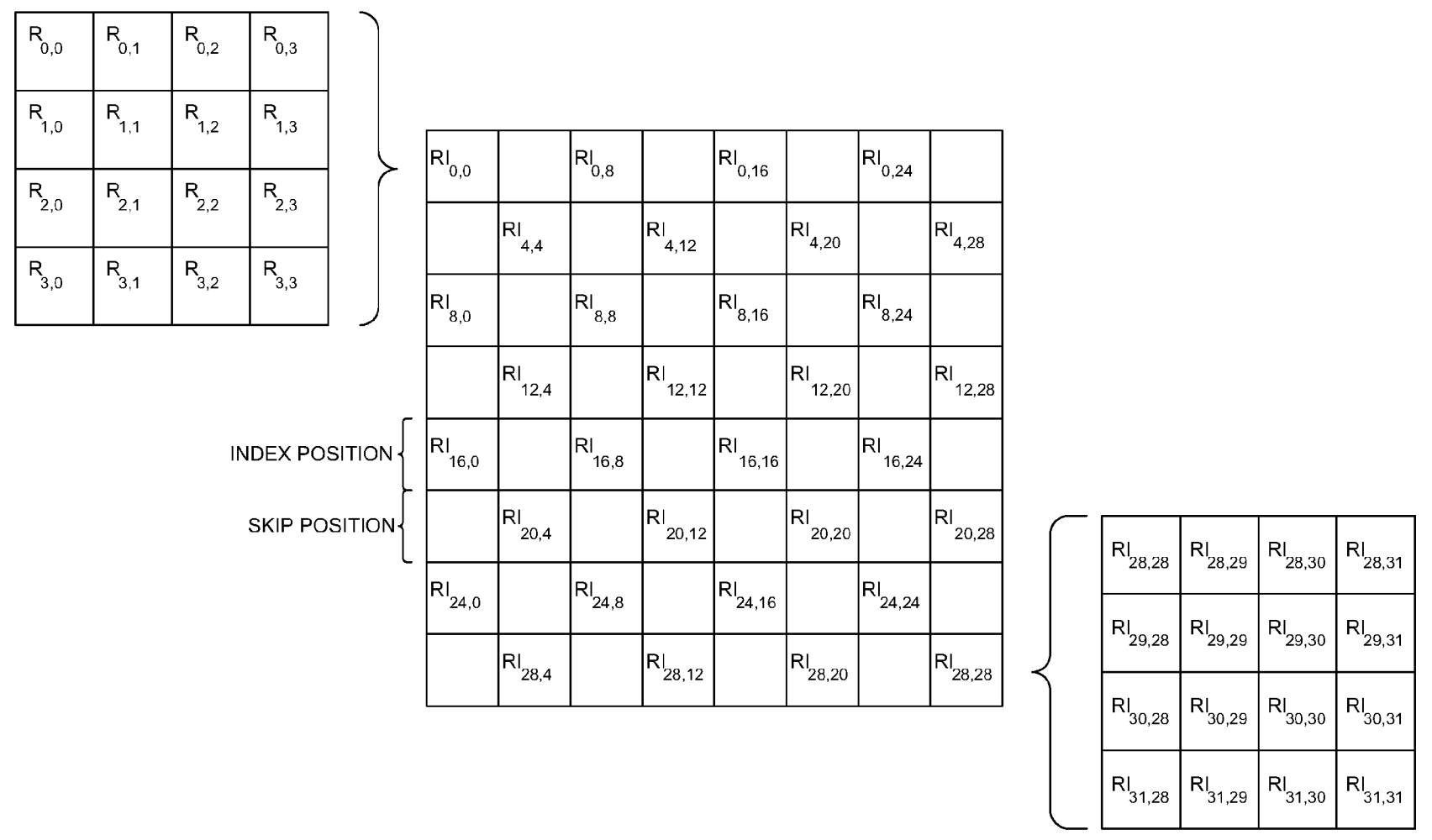

In some implementations, the indexing positions may be identified using an alternating, or checkerboard, pattern. FIG. 9 is a diagram of an example of alternating position indexing in accordance with implementations of this disclosure. As shown in FIG. 9, identified indexing positions may alternate with omitted, or skipped, positions.

Referring to FIG. 7, in some implementations, generating index information for the reconstructed frame at 730 may include determining an indexing position value for each identified indexing position. For example, the indexing position value for an indexing position may be the sum or average of the pixel values for the pixels in the respective indexing position, which may be an 8-bit value. In some implementations, the pixel values may be the luminance values of the respective pixels and the indexing position value may be $\frac{1}{32}^{nd}$ of the size of the corresponding luminance data. For example, the indexing position value for an indexing position $RI_{x,y}$ may be the average of the reconstructed luminance pixel values $R_{x,y}$ for the pixels in the respective indexing position, which may be expressed as the following:

$$RI_{x,Y} = \frac{1}{16}\sum_{r=0}^{3}\sum_{s=0}^{3} R_{x+r,y+s}.$$ (Equation 1)

In some implementations, the reconstructed frame may be encoded at 740. For example, the reconstructed frame may be losslessly encoded, which may significantly reduce resource utilization, such as bus bandwidth. In some implementations, losslessly encoding the reconstructed frame may include generating a predicted reconstructed frame based on the reconstructed frame.

In some implementations, generating a predicted reconstructed frame based on the reconstructed frame may include identifying prediction areas of the reconstructed frame. In some implementations, the prediction areas may include blocks, such as the blocks shown in FIG. 6. For example, 4×4 blocks, 8×8 blocks, 16×16 blocks, 32×32 blocks, 64×64 blocks, or any other prediction area size may be used. In some implementations, parallel prediction of 4×4 blocks may be prioritized and the prediction area size may be 4×4. In some implementations, increasing the prediction area size may improve performance. In some implementations, a memory, such as a buffer, may be used to store an N×N subsampled frame, which may be generated by subsampling the current frame and may be used for predicting the top-left corner of the prediction area.

In some implementations, the size of the prediction area may be determined based on a cache block size, such as 64×64. In some implementations, the prediction area size may be identified such that an initial predictor is available for predicting the top-left corner pixel of each prediction area. For example, the initial predictor may be the index position value corresponding to the top-left corner pixel of a prediction area, such that index position $I_{x,y}$ may be used as an initial predictor for the top-left pixel, in the pixel domain, starting from position $P_{4x,4y}$.

In some implementations, generating a predicted reconstructed frame may include predicting pixel values for the reconstructed frame based on neighboring reconstructed pixels. For example, some pixels, such as the pixel in the top-left corner of a prediction area, may be predicted based on a co-located pixel value; some pixels, such as pixels in the top row, or edge, of a prediction area, may be predicted based on reconstructed pixels to the left of the current pixels; some pixels, such as pixels in the left column, or edge, of a prediction area, may be predicted based on reconstructed pixels above the current pixels; and some pixels may be predicted using a Paeth predictor.

In some implementations, a Paeth predictor for a current pixel Q may be generated based on neighboring reconstructed pixels, such as a neighboring pixel to the left (A) of the current pixel, a neighboring pixel above (B) the current pixel, and a neighboring pixel above and to the left of the current pixel (C). Other pixels, or combinations of pixels, may be used. A preliminary predictor P may be identified based a difference between the top-left pixel (C) and the sum of the left pixel (A) and the top pixel (B), which may be expressed as P=A+B−C. The distance between each neighboring pixel A/B/C, and the preliminary predictor P may be identified based on the absolute value of the difference between the preliminary predictor and each respective neighboring pixel A/B/C, which may be expressed as PA=|P−A|; PB=|P−B|; PC=|P−C|. The Paeth predictor may be identified based on the neighboring pixel having the smallest distance from P, which may be expressed as X=min (PX), X=A,B,C. A residual R for the input pixel Q may be determined based on the difference between the Paeth predictor and the current pixel Q, which may be expressed as R=Q−D. In some implementations, the predictors may be generated on a pixel-by-pixel basis.

In some implementations, losslessly encoding the reconstructed frame may include entropy coding the predicted reconstructed frame. For example, entropy coding may be performed for 4×4 blocks of the predicted reconstructed frame, each of which may include four 2×2 blocks. An entropy coding mode may be identified for the 2×2 blocks of a 4×4 block, or for each 2×2 block independently. In some implementations, an indicator, such as an entropy_mode_flag, which may be a one bit value, may indicate whether the 2×2 blocks of a 4×4 block are entropy coded using an entropy coding mode identified for the 4×4 block, which may be expressed as 1b=4×4; or using an entropy coding mode identified for each 2×2 block, which may be expressed as 0b=2×2. FIG. 10 is a diagram of an example of entropy coding modes in accordance with implementations of this disclosure.

In some implementations, identifying an entropy coding mode may include determining an entropy coding scheme for each 2×2 block in a 4×4 block, and determining whether to use 4×4 coding based on the identified 2×2 coding schemes. For example, the entropy coding schemes for each 2×2 block in a 4×4 block may match, and 4×4 entropy coding may be used. In another example, one or more of the entropy coding schemes for the 2×2 blocks may be different, and 2×2 entropy coding may be used.

In some implementations, identifying an entropy coding mode may include determining a bit cost, indicating the number of bits generated by encoding a block using an identified encoding scheme, for each encoding scheme. For example, a bit cost for the entropy coding schemes for each 2×2 block may be determined, and a 4×4 coding scheme of EntropyCoding4×4=Max{entropy_coding_2×2[i], i=0,1,2,3} may be identified. Bits representing the entropy scheme and residual data may be accumulated into one or more counters. For example, the bits representing the entropy scheme, and residual data, may be accumulated into two counters SchemeBits2×2, for 2×2 entropy coding, and SchemeBits4×4, for 4×4 entropy coding. In an example, 2×2 entropy coding may include individually determining each of the four 2×2 blocks of the 4×4 block. In another example, 4×4 encoding may include determining the bits based on EntropyCoding4×4. In some implementations, the mode that generates the lowest number of bits may be used for entropy coding.

In some implementations, some entropy coding modes, such as entropy_coding_4×4 and entropy_coding_2×2[ ], may include variable length coding (VLC), which may be indicated as shown in Table 1.

TABLE 1

| Coding Scheme | VLC word | Residual range |
| --- | --- | --- |
| zero | 0 | R = 0 for each pixel |
| one | 10 | −1 <= R <= 1 |
| two | 1100 | −3 <= R <= 3 |
| threebit | 1101 | −7 <= R <= 7 |
| fourbit | 11100 | −15 <= R <= 15 |
| fivebit | 11101 | −31 <= R <= 31 |
| six bit | 11110 | −63 <= R <= 63 |
| Full | 11111 | Pixel data encoded as is |

In some implementations, residual data, such as pixel_residual[ ][ ], may be VLC coded. For example, a code set may be identified based on the corresponding entropy coding scheme. In some implementations, some entropy coding modes, such as entropy coding scheme zero, may not include encoding residual data.

In some implementations, some entropy coding modes, such as entropy coding scheme one, may include representing blocks where each pixel residual R is in the range −1 to 1, which may be expressed as −1<=R<=1. Table 2 shows an example of VLC codes for entropy coding scheme one for luminance pixels or chrominance pixels.

TABLE 2

| Code | Residual |
| --- | --- |
| 0 | 0 |
| 1S | 1 + Sign-bit |

In some implementations, some entropy coding modes, such as entropy coding scheme two, may include representing blocks where each pixel residual R is in the range −3 to 3, which may be expressed as −3<=R<=3. Table 3 shows an example of VLC codes for entropy coding scheme two for luminance pixels and Table 4 shows an example of VLC codes for entropy coding scheme two for chrominance pixels

TABLE 3

| Code | Residual |
| --- | --- |
| 110 | 0 |
| 0S | 1 + Sign-bit |
| 10S | 2 + Sign-bit |
| 111S | 3 + Sign-bit |

TABLE 4

| Code | Residual |
| --- | --- |
| 110 | 0 |
| 10S | 1 + Sign-bit |
| 110S | 2 + Sign-bit |
| 111S | 3 + Sign-bit |

In some implementations, some entropy coding modes, such as entropy coding schemes threebit, fourbit, fivebit, and sixbit, may include using a code word including the absolute value of the pixel residual represented using a defined number of bits for luminance pixels or chrominance pixels. For example, the entropy coding scheme threebit may include using a code word including the absolute value of the pixel residual represented using three bits, the entropy coding scheme fourbit may include using a code word including the absolute value of the pixel residual represented using four bits, the entropy coding scheme fivebit may include using a code word including the absolute value of the pixel residual represented using five bits, and the entropy coding scheme sixbit may include using a code word including the absolute value of the pixel residual represented using six bits. In some implementations, the absolute value of the pixel residual may be nonzero and the code word may include a sign bit. For example, a sign bit of 0 may indicate a positive pixel residual, and a sign bit of 1 may indicate a negative pixel residual.

In some implementations, some entropy coding modes, such as entropy coding scheme full, each pixel's value may be encoded as is, which may include using eight bits per pixel for luminance pixels or chrominance pixels.

In some implementations, entropy coding may include entropy coding of a residual block, which may include determining a maximum absolute residual M for a current 2×2 block, and determining an entropy coding scheme based on the maximum absolute residual M. FIG. 11 is a diagram of an example of determining an entropy coding scheme in accordance with implementations of this disclosure.

In some implementations, the index information, the entropy coded reconstructed frame, or both may be stored in a memory, such as an external memory. In some implementations, losslessly encoding the reconstructed frame may include organizing data to enable random access into the encoded frame. For example, the data may be organized to enable vertical random access, horizontal random access, or both. In some implementations, organizing data may include organizing the physical location of data in a physical storage medium.

Figure 12:
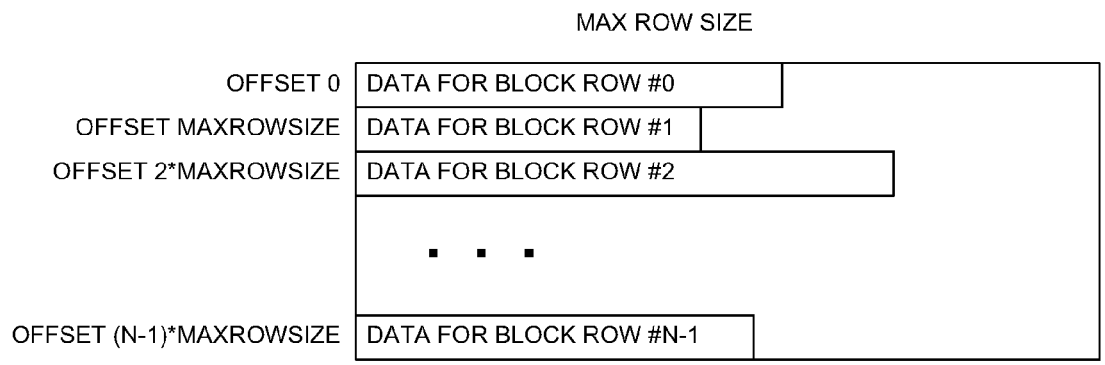
FIG. 12 is a diagram of an example of vertical random access in accordance with implementations of this disclosure.

In some implementations, losslessly encoding the reconstructed frame may include organizing the entropy coded data to enable vertical random access into the encoded frame, which may include determining a maximum row size indicating the maximum width of an encoded row of a frame based on the width of a row of the corresponding unencoded frame and the encoding mode. For example, optimal entropy coding using entropy_mode_flag=4×4 and entropy_coding_4×4=full may generate six extra bits for encoding each 4×4 block of the frame, which may be the maximum extra data for encoding each 4×4 block of the frame. In an example, a row of 4×4 blocks for an unencoded 1920*1080 frame may utilize 61440 bits and a corresponding encoded row may utilize a maximum of 64320 bits, which may be the maximum row size. In some implementations, sub-optimal entropy coding using entropy_mode_flag=2×2 and each entropy_coding_2×2[ ]=full may generate 21 extra bits for encoding each 4×4 block of the frame. In some implementations, organizing data may include organizing the entropy data associated with the individual 4×4 rows to start at intervals based on the maximum row size. For example, the maximum row size may be 64320 bits, and the rows may be organized to start at intervals such that each 4×4 block row N may start at bit offset N*64320. In some implementations, the encoder may randomly access the start of each 4×4 block row based on the interval. FIG. 12 is a diagram of an example of vertical random access in accordance with implementations of this disclosure. The example shown represents memory usage for entropy coding an image N 4×4 block rows tall using a maximum row size, MaxRowSize. In some implementations, external memory may be allocated based on the number of rows N, and the maximum row size, which may be expressed as N*MaxRowSize.

Figure 13:
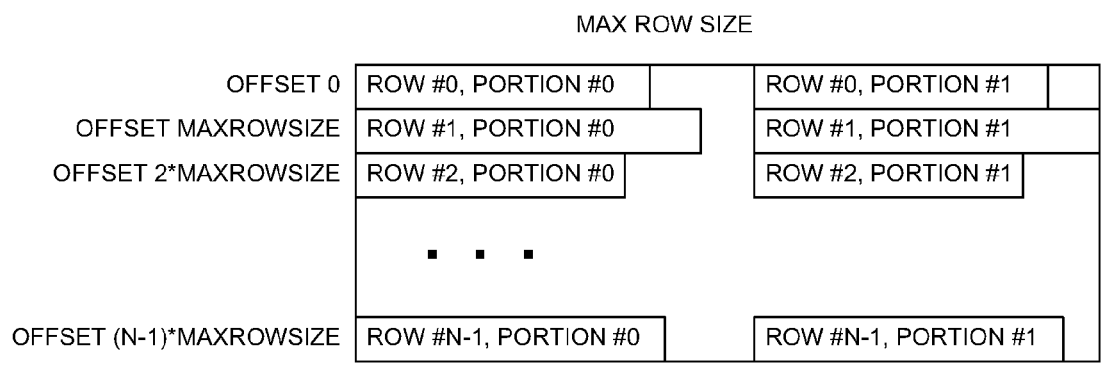
FIG. 13 is a diagram of an example of horizontal random access in accordance with implementations of this disclosure.

In some implementations, losslessly encoding the reconstructed frame may include organizing the entropy coded data to enable horizontal random access into the encoded frame. For example, portions of the frame, such as portions including N horizontally adjacent 4×4 blocks, may be set to start at respective intervals. For example, the maximum extra data for encoding each 4×4 block may be six bits, the cache block size may be 64×64, and a 16×4 block may utilize a maximum of 536 bits. Each 16×4 portion may be organized to start at intervals of 536 bits, starting from the block row offset. In some implementations, horizontal random access may be used enable block level random access. FIG. 13 is a diagram of an example of horizontal random access in accordance with implementations of this disclosure. The example shown represents memory usage for a block row including two portions. In some implementations, a table may indicate the lengths of the coded portions. In some implementations, the optimal size of the portions for horizontal random access may be determined. For example, each portion may generate a non-sequential read operation, which may increase resource utilization, such as bus load, and the optimal portion size may be determined based on balancing the availability of horizontal read access against bus load.

Referring to FIG. 7, in some implementations, encoding a frame at 720 may include using advanced motion estimation inter-prediction. For example, the current frame may be an inter-coded frame and encoding the current frame may include advanced motion estimation inter-prediction.

FIG. 14 is a block diagram of an example of advanced motion estimation inter-prediction in accordance with implementations of this disclosure. Advanced motion estimation inter-prediction, or any portion thereof, can be implemented in a device, such as the computing and communication devices 100A/100B/100C shown in FIG. 2. For example, an encoder, such as the encoder 400 shown in FIG. 4, can implement advanced motion estimation, or any portion thereof, using instruction stored on a tangible, non-transitory, computer readable media, such as memory 150 shown in FIG. 1. Although not explicitly shown in FIG. 1, the device, or a portion of the device, may include or access an internal memory, an external memory, or both. For example, an encoder may retrieve data from an external memory and store the data in an internal memory, such as a frame buffer, for efficient access. In FIG. 14, an external memory 1410 is shown for clarity. In some implementations, indexed frame data 1412 and entropy coded frame data 1414 may be stored on the external memory 1410.

In some implementations, advanced motion estimation inter-prediction may include identifying a current block of the current frame. For example, the current block may be identified as one of a plurality of N×N pixel blocks in the current frame, such as 64×64 pixel blocks, 32×32 pixel blocks, 16×16 pixel blocks, or any other size blocks. In some implementations, advanced motion estimation inter-prediction may include identifying optimal inter-prediction information for a current block, which may include block motion estimation at 1420, pixel motion estimation at 1430, sub-pixel motion estimation at 1440, or a combination thereof. In some implementations, advanced motion estimation inter-prediction may include identifying optimal intra-prediction information for the current block at 1460, identifying an encoding mode, such as intra-prediction or inter-prediction, at 1470, and encoding the current block at 1480. In some implementations, advanced motion estimation inter-prediction may include determining whether the current frame includes another unencoded block. For example, the current frame may include another unencoded block, such as a block in a column to the right of the current block or a block in a row below the current block, and block motion estimation at 1420, pixel motion estimation at 1430, sub-pixel motion estimation at 1440, intra-prediction mode identification at 1460, encoding mode identification at 1470, and encoding at 1480, may be performed for the unencoded block.

In some implementations, block-resolution, or coarse-resolution, motion information may be generated at 1420. For example, generating block-resolution motion information at 1420 may include generating index information for the current block and estimating motion based on the index information for the current block and index information for a reference frame. In some implementations, block motion estimation at 1420 may include generating block-resolution motion vectors 1422, generating a block motion estimation partition list 1424, or both.

In some implementations, generating block motion information at 1420 may include generating index information for the current block. For example, the index information may include index position values for index positions $I_{x,y}$, for the current block, which may be, for example, an average of the luminance pixel values $P_{x,y}$ for the pixels in the respective indexing positions, and may be expressed as the following:

$$I_{x,Y} = \frac{1}{16}\sum_{r=0}^{3}\sum_{s=0}^{3} P_{x+r,y+s}. \qquad \text{(Equation 2)}$$

In some implementations, identifying index information for the current block may include generating index position values for index positions such that each pixel of the current block is included in an index position. For example, the current block may be a 16×16 pixel block and index position values may be generated for index positions $I_{0,0}$, $I_{0,4}$, $I_{0,8}$, $I_{0,12}$, $I_{4,0}$, $I_{4,4}$, $I_{4,8}$, $I_{4,12}$, $I_{8,0}$, $I_{8,4}$, $I_{8,8}$, $I_{8,12}$, $I_{12,0}$, $I_{12,4}$, $I_{12,8}$, and $I_{12,12}$. In some implementations, identifying index information for the current block may include generating index position values for adjacent index positions. For example, the index positions may not overlap, generating the index information may not include skipping index positions.

In some implementations, generating block motion information at 1420 may include identifying reference frame index information. For example, index information 1412 for the reference frame may be retrieved from external memory 1410 and may be buffered in an internal memory. In some implementations, identifying the reference frame index information may include identifying a reference frame and generating the reference frame index information, which may be similar to the indexing shown in FIG. 7 at 730.

In some implementations, generating block motion information at 1420 may include generating interpolated index information. For example, the reference frame index information 1412 may include information corresponding to alternating index positions, such as the index information shown in FIG. 9, and index information for the omitted, or skipped, index positions may be interpolated from neighboring index positions, such as the index positions above, left, right, and below the current index position, using linear interpolation, 2-tap bilinear interpolation, or any other type of interpolation capable of generating index information for the omitted index positions. In some implementations, index positions along edges may be interpolated using other edge index positions. For example, index positions along a top edge may be interpolated based on index positions to the left and right of the current index position, and index positions along a left edge may be interpolated based on index position above and below the current index position. The index information $RI_{x,y}$ and the interpolated index information $RI'_{x,y}$, or a combination thereof, may include a representation of each 4×4 index position of the reconstructed frame.

In some implementations, generating block motion information at 1420 may include buffering the index information for motion searching. For example, a portion, such as N rows, of the index information may be buffered in one or more internal memories. In some implementations, the number of index rows included in a row of buffered index information may be determined based on the index block size and the input, or coding, block size. For example, the input block size may be 64×64, the index block size may be 4×4, and a row of buffered index information may include 16 index rows. In some implementations, the number N of rows buffered may indicate a vertical search area. For example, the input block size may be 64×64, the index block size may be 4×4, and the search window height would be 80 index rows. In some implementations, the number N of buffered rows may be greater than five; however, any number of rows may be used. In some implementations, the rows buffered may be identified based on the current block height and location, and may include two block height rows above the current block and two block height rows below the current block. For example, the current block size may be 64×64, the current block location may be block row 10, and the buffered index information may include block rows 8, 9, 11, and 12, which may provide a search window height of 64 index positions which may correspond to 256 pixels.

In some implementations, generating block motion information at 1420 may include block-resolution motion searching. For example, block-resolution motion searching may include searching the reference frame index information to identify a reference index position that best corresponds with the index position value for the current block. In some implementations, block-resolution motion searching may include identifying a search area, or search window, in the reference frame index information, and searching prediction unit sized blocks, or prediction positions, of the search area for index information best matching the index information for the current block. For simplicity, coordinates within a search area may be indicated with reference to the search area. For example, the top-left coordinate 0,0 of a search area may correspond to a coordinate in the $65^{th}$ row and $65^{th}$ column of the frame.

Figures 15, 16:
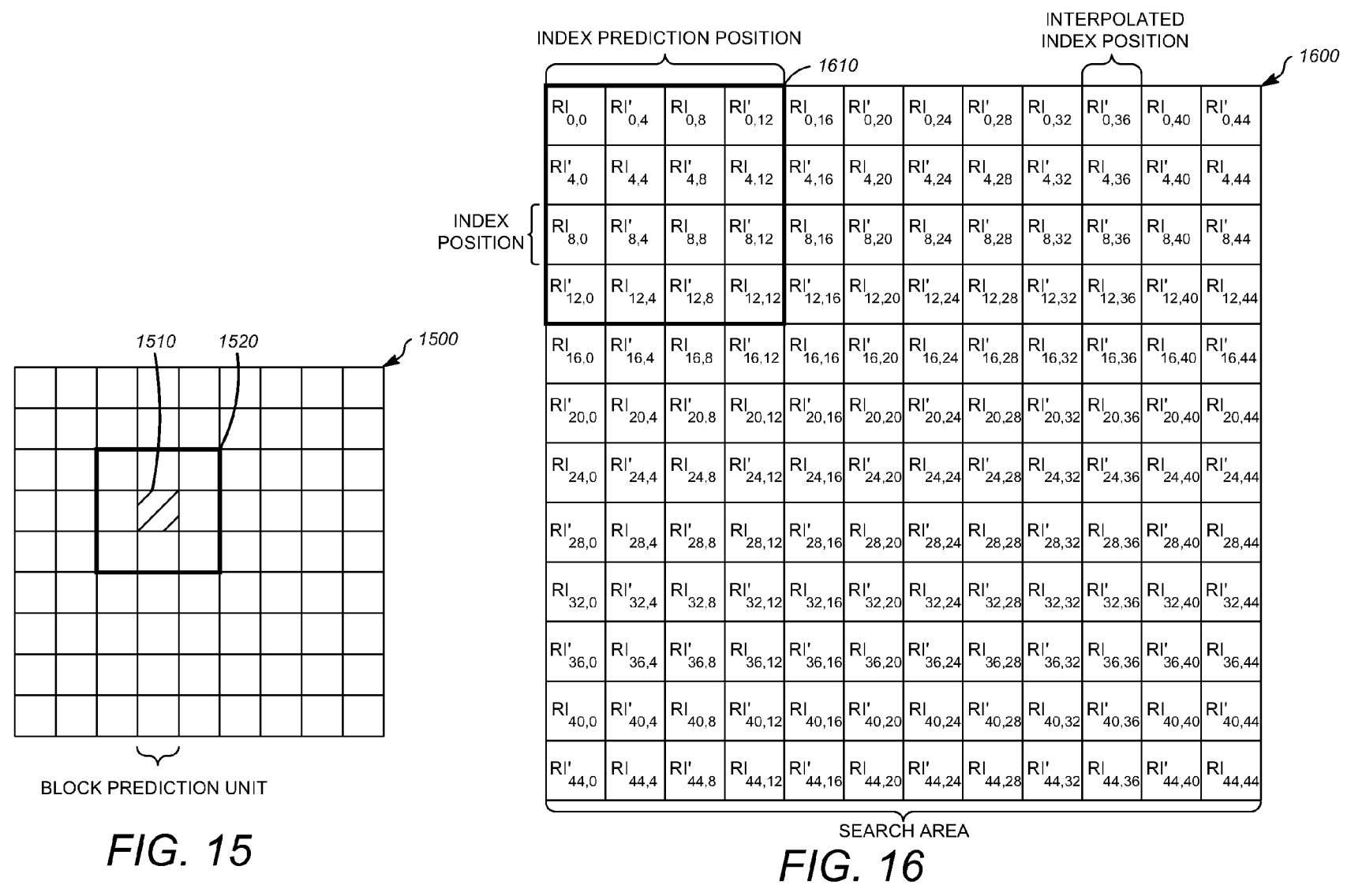

FIG. 15 is a diagram of an example of a prediction search window in accordance with implementations of this disclosure. FIG. 15 shows a representation of a portion 1500 of a reference frame including a block 1510 spatially corresponding to, or co-located with, the location of a current block in the current frame for encoding, and an M×M pixel search window 1520 including the co-located reference block 1510 and neighboring reference blocks. For example, the prediction unit size may be 16×16 pixels, which may be a maximum prediction unit size and may be the size of the current block, and the search window 1520 may include 48×48 pixels. Although a prediction unit size of 16×16 pixels and a search window size of 48×48 pixels is shown for simplicity, any search window size M×M and any prediction unit size N×N, such as 64×64, 32×32, or 8×8, may be used. Although the prediction unit and search area are shown in FIG. 15 in reference to the reference frame for simplicity, generating block motion information at 1420 may include motion searching using the index information corresponding to the reference frame. For example, a prediction position $B_{x,y}$ may be a N×N prediction unit, which may include index information, such as index position values for L×L index positions $RI_{Lx,Ly}$-$RI_{x+((N/L)-1)L,y+((N/L)-1)L}$, representing pixels $P_{x,y}$-$P_{x+N-1,y+N-1}$ of the search area. In an example, the prediction unit size and block size may be 16×16 pixels and the prediction position $B_{0,0}$ may include index information representing pixels $P_{0,0}$-$P_{15,15}$ of the search area, such as a 4×4 block of index positions.

In some implementations, each N×N pixel prediction position $B_{x,y}$ within the M×M search area, which may include partially overlapping prediction positions, may be represented by a respective candidate motion vector $MV_{x,y}$, and the motion searching may include processing each candidate motion vector. For example, the candidate motion vectors may include 33×33 candidate motion vectors, such as $MV_{0,0}$, which may indicate prediction position $B_{0,0}$ in the top-left corner of the search area, which may include index information representing pixels $P_{0,0}$-$P_{15,15}$ of the search area; $MV_{0,1}$, which may indicate prediction position $B_{0,1}$, which may include index information representing pixels $P_{0,1}$-$P_{15,16}$ of the search area; and $MV_{32,32}$, which may indicate prediction position $B_{32,32}$, which may include index information representing pixels $P_{32,32}$-$P_{47,47}$ of the search area.

FIG. 16 is a diagram of an example of an index information search window in accordance with implementations of this disclosure. FIG. 16 shows a representation of a portion 1600 of the reference frame index information for motion estimation for a current block. For example, the portion 1600 may correspond with the M×M search area 1520 shown in FIG. 15, such that each reference index position $RI_{x,y}$, which may include interpolated reference index positions $RI'_{x,y}$, represents a 4×4 pixel block of the reference frame, and the prediction unit 1610 includes 4×4 index positions $RI_{x,y}$, which represents 16×16 pixels of the reference frame.

In some implementations, an index-based SAD may be determined for each candidate motion vector $MV_{0,0}$-$MV_{M-N,M-N}$, and the optimal candidate motion vector $MV_{x,y}$, such as the candidate motion vector having the minimum SAD, may be used for the block motion prediction. In some implementations, determining an index-based SAD for a candidate motion vector $MV_{x,y}$ may include determining the sum of absolute differences between the index position values for the index positions $I_{x,y}$ of the current block, and the index position values for the index positions $RI_{x,y}$ of the reference frame index information included in the prediction position $B_{x,y}$ corresponding to the candidate motion vector $MV_{x,y}$. For example, as shown in FIG. 16, an index-based SAD for the candidate motion vector $MV_{0,0}$ may be determined based on the sum of absolute differences between the index position values for the index positions of the current block $I_{0,0}$, $I_{0,4}$, $I_{0,8}$, $I_{0,12}$, $I_{4,0}$, $I_{4,4}$, $I_{4,8}$, $I_{4,12}$, $I_{8,0}$, $I_{8,4}$, $I_{8,8}$, $I_{8,12}$, $I_{12,0}$, $I_{12,4}$, $I_{12,8}$, $I_{12,12}$, and the index position values for the index positions $RI_{0,0}$, $RI'_{0,4}$, $RI_{0,8}$, $RI'_{0,12}$, $RI'_{4,0}$, $RI_{4,4}$, $RI'_{4,8}$, $RI_{4,12}$, $RI_{8,0}$, $RI'_{8,4}$, $RI_{8,8}$, $RI'_{8,12}$, $RI'_{12,0}$, $RI_{12,4}$, $RI'_{12,8}$, $RI_{12,12}$, of the reference frame index information included in the prediction position 1610.

Referring to FIG. 14, in some implementations, generating block motion information at 1420 may include generating the block motion estimation partition list 1424, which may include partition mode motion searching, which may include searching each prediction position $B_{x,y}$ of the search area based on one or more partition schemes. For example, the maximum coding unit size may be 64×64 pixels and the partition scheme may include 32×64 pixel partitions, 64×32 pixel partitions, 32×32 pixel partitions, 16×32 pixel partitions, 32×16 pixel partitions, 16×16 pixel partitions, 8×16 pixel partitions, 16×8 pixel partitions, 8×8 pixel partitions, or any other size partition. In some implementations, a coding tree depth may indicate the smallest partition size searched. For example, the maximum coding unit size may be 64×64 pixels, the coding tree depth may be 3, which may indicate a smallest partition size searched of 16×16 pixels, and the partition scheme may include 32×64 pixel partitions, 64×32 pixel partitions, 32×32 pixel partitions, 16×32 pixel partitions, 32×16 pixel partitions, and 16×16 pixel partitions. In another example, the maximum coding unit size may be 32×32 pixels, the coding tree depth may be 3, which may indicate a smallest partition size searched of 8×8 pixels, and the partition scheme may include 32×32 pixel partitions, 16×32 pixel partitions, 32×16 pixel partitions, 16×16 pixel partitions, 8×16 pixel partitions, 16×8 pixel partitions, and 8×8 pixel partitions. In some implementations, partition mode motion searching may include concurrently, or substantially simultaneously, searching the prediction position $B_{x,y}$ using multiple partitions.

Figure 17:
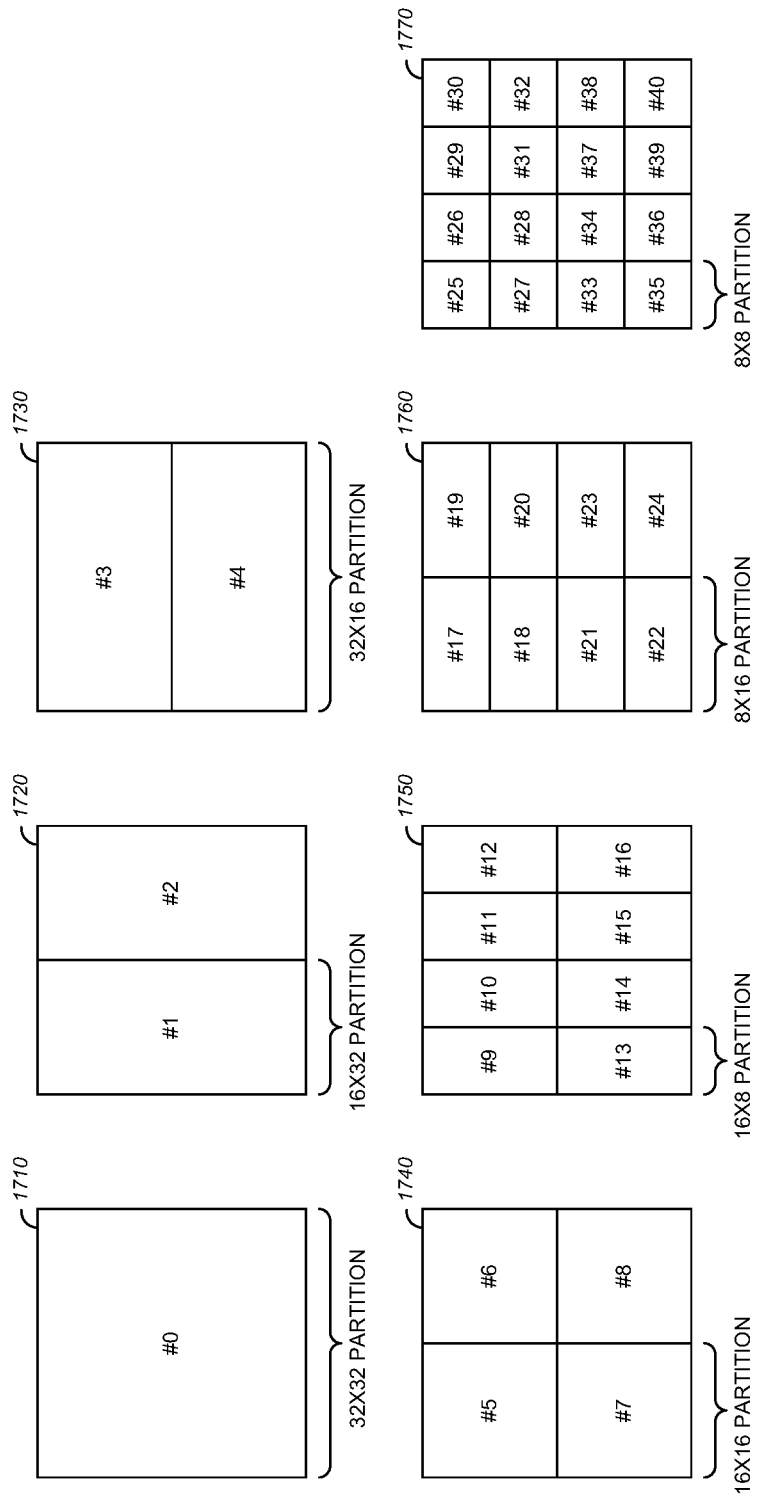
FIG. 17 is a diagram of an example of a partition scheme in accordance with implementations of this disclosure.

FIG. 17 is a diagram of an example of a partition scheme in accordance with implementations of this disclosure. As shown in FIG. 17, in some implementations, the maximum coding unit size may be 32×32 pixels, the coding tree depth may be 3, which may indicate a minimum partition size searched of 8×8 pixels, and partition motion searching may include using 41 partitions, which may range in size from 32×32 pixels to 8×8 pixels inclusive. In some implementations, the partitions may be enumerated as partitions 0-40, and may be organized as subdivision levels 1710-1770.

In some implementations, a SAD accumulator, which may be a memory, such as an internal buffer, may be associated with each respective enumerated partition, and may accumulate SAD values for each respective partition. For example, 41 SAD accumulators may be used to accumulate SAD values for the 41 partitions shown in FIG. 17. Table 5 shows an example of some encoding schemes, including coding tree depth, partition sizes, number of SAD accumulators, and number of accumulations per index position for each prediction position.

TABLE 5

| Depth | Partition Size | Accumulators | Accumulations |
|---|---|---|---|
| 2 | 16 × 16 to 8 × 8 | 9 | 4 |
| 3 | 32 × 32 to 8 × 8, 64 × 64 to 16 × 16 | 41 | 7 |
| 4 | 64 × 64 to 8 × 8 | 169 | 10 |

Figure 18:
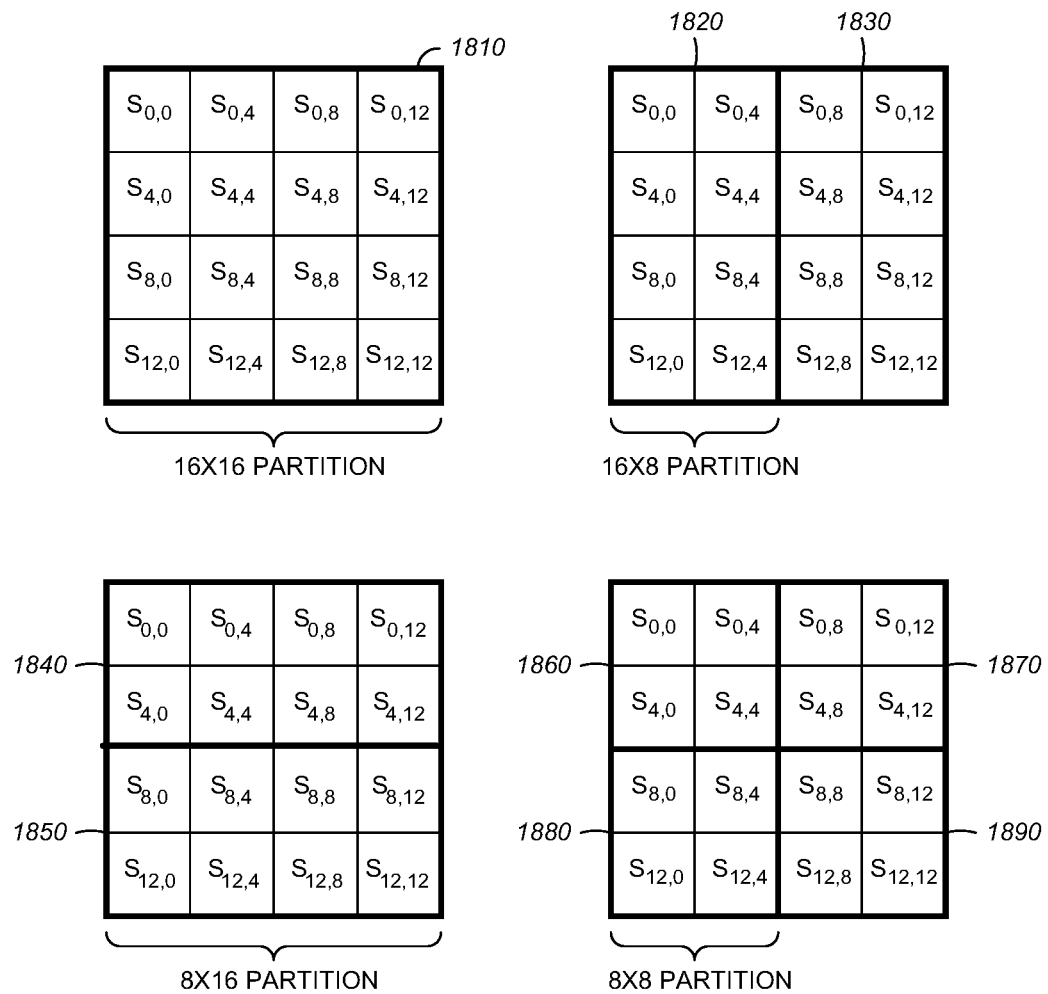
FIG. 18 is a diagram of an example of a block-resolution partition searching in accordance with implementations of this disclosure.

FIG. 18 is a diagram of an example of a block-resolution partition searching in accordance with implementations of this disclosure. In some implementations, block-resolution partition mode motion searching may include searching the absolute value of the difference $S_{i,j}$ between an index $I_{i,j}$ of the index information for the current block and a corresponding index $RI_{i,j}$ of the reference frame index information. For simplicity, FIG. 18 shows a search using a maximum coding unit size of 16×16 pixels, a coding tree depth of 2, which may indicate a smallest partition size searched of 8×8 pixels, and an index position size of 4×4 pixels.

In some implementations, each partition may be associated with a respective SAD accumulator, which may accumulate a sum of difference values $S_{i,j}$ for the partition. For example, the SAD accumulator associated with partition #0 1810 may accumulate the sum of $S_{0,0}$, $S_{0,4}$, $S_{0,8}$, $S_{0,12}$, $S_{4,0}$, $S_{4,4}$, $S_{4,8}$, $S_{4,12}$, $S_{8,0}$, $S_{8,4}$, $S_{8,8}$, $S_{8,12}$, $S_{12,0}$, $S_{12,4}$, $S_{12,8}$, and $S_{12,12}$; the SAD accumulator associated with partition #1 1820 may accumulate the sum of $S_{0,0}$, $S_{0,4}$, $S_{4,0}$, $S_{4,4}$, $S_{8,0}$, $S_{8,4}$, $S_{12,0}$, and $S_{12,4}$; the SAD accumulator associated with partition #3 1830 may accumulate the sum of $S_{0,8}$, $S_{0,12}$, $S_{4,8}$, $S_{4,12}$, $S_{8,8}$, $S_{8,12}$, $S_{12,8}$, and $S_{12,12}$; the SAD accumulator associated with partition #4 1840 may accumulate the sum of $S_{0,0}$, $S_{0,4}$, $S_{0,8}$, $S_{0,12}$, $S_{4,0}$, $S_{4,4}$, $S_{4,8}$, and $S_{4,12}$; the SAD accumulator associated with partition #5 1850 may accumulate the sum of $S_{8,0}$, $S_{8,4}$, $S_{8,8}$, $S_{8,12}$, $S_{12,0}$, $S_{12,4}$, $S_{12,8}$, and $S_{12,12}$; the SAD accumulator associated with partition #6 1860 may accumulate the sum of $S_{0,0}$, $S_{0,4}$, $S_{4,0}$, and $S_{4,4}$; the SAD accumulator associated with partition #7 1870 may accumulate the sum of $S_{0,8}$, $S_{0,12}$, $S_{4,8}$, and $S_{4,12}$; the SAD accumulator associated with partition #8 1880 may accumulate the sum of $S_{8,0}$, $S_{8,4}$, $S_{12,0}$, and $S_{12,4}$; and the SAD accumulator associated with partition #9 1890 may accumulate the sum of $S_{8,8}$, $S_{8,12}$, $S_{12,8}$, and $S_{12,12}$.

In some implementations, partition mode motion searching may be performed for each prediction position in the search area. For example, the search area size may be 48×48 pixels, the prediction coding unit size may be 16×16 pixels, the index block size may be 4×4, the coding depth may be eight, the search area may include 33×33 prediction positions, the partition scheme may include nine partition modes in four sublevels, and 33×33×9 SAD values may be generated.

In some implementations, partition mode motion searching may include, for each prediction position, generating a cost value for each partition based on the accumulated SAD values. For example, the cost value may be determined based on a sum of SAD values and associated penalty values, such as the partition penalty and the motion vector penalty. In some implementations, a best motion vector for each partition, such as the motion vector corresponding to the smallest SAD value for the respective partition, may be identified and may be stored in memory. For example, a SAD value for each partition for a first prediction position may be generated, a SAD value for each partition for a second prediction position may be generated and compared with the corresponding SAD values generated for the first prediction position, and the best SAD value for each partition, which may be the smallest SAD value for the partition, may be stored in a memory, such as a buffer.

Referring to FIG. 14, in some implementations, a block-resolution motion vector for the current block may be stored at 1422. For example, a block-resolution motion vector, such as the best block-resolution motion vector generated for the current block or an average of the block-resolution motion vectors generated for the current block, may be stored for the current block. In some implementations, the block-resolution motion vector stored may be generated based on an average of a block-resolution motion vector for a neighboring coding block to the left of the current block and a block-resolution motion vector for a neighboring coding block above the current block. In some implementations, storing a block-resolution motion vector for the current block may include storing a block-resolution motion vector penalty $BPenalty_C$ for the block-resolution motion vector with the block-resolution motion vector at 1422.

In some implementations, a block-resolution motion vector penalty $BPenalty_C$ may be determined for a motion component C, such as a horizontal motion component $C_X$ or a vertical motion component $C_Y$, based on coding parameters, such as a quantization parameter (QP) multiplier DiffPenaltyMultiplier[QP], a rate distortion (RD) coefficient, or both. In some implementations, determining the block-resolution motion vector penalty $BPenalty_C$ may include identifying the coding parameters. For example, the coding parameters may be identified based on instructions stored in a memory, such as an external memory, or may be received as input. In some implementations, the QP multiplier may be identified based on a QP-based multiplier table. In some implementations, $BMV_C$ may indicate a component of the block-resolution motion vector identified for the current block in the pixel domain, $BPred_C$ may indicate a block-resolution predictor corresponding to the component of the block-resolution motion vector identified for the current block in the pixel domain, and determining a block-resolution motion vector penalty $BPenalty_C$ for a component C may be expressed as the following:

$$BPenalty_C = 10 * \sqrt{|BMV_C - BPred_C|} * \text{DiffPenaltyMultiplier}[QP]/160. \quad \text{(Equation 3)}$$

In some implementations, generating block motion information at 1420 may include generating a coding tree. For example, the maximum prediction unit size may be 64×64, the search depth, or coding tree depth, may be 4, which may indicate that the smallest partition size searched is 8×8, and the motion search may generate a 64×64 motion vector, two 64×32 motion vectors, two 32×64 motion vectors, four 32×32 motion vectors, eight 32×16 motion vectors, eight 16×32 motion vectors, sixteen 16×16 motion vectors, 32 16×8 motion vectors, 32 8×16 motion vectors, 64 8×8 motion vectors, or a combination thereof.

In some implementations, generating the coding tree may include optimizing the coding tree. For example, optimizing the coding tree may include traversing the motion vectors and corresponding cost values from top to bottom or from bottom to top.

Figure 19:
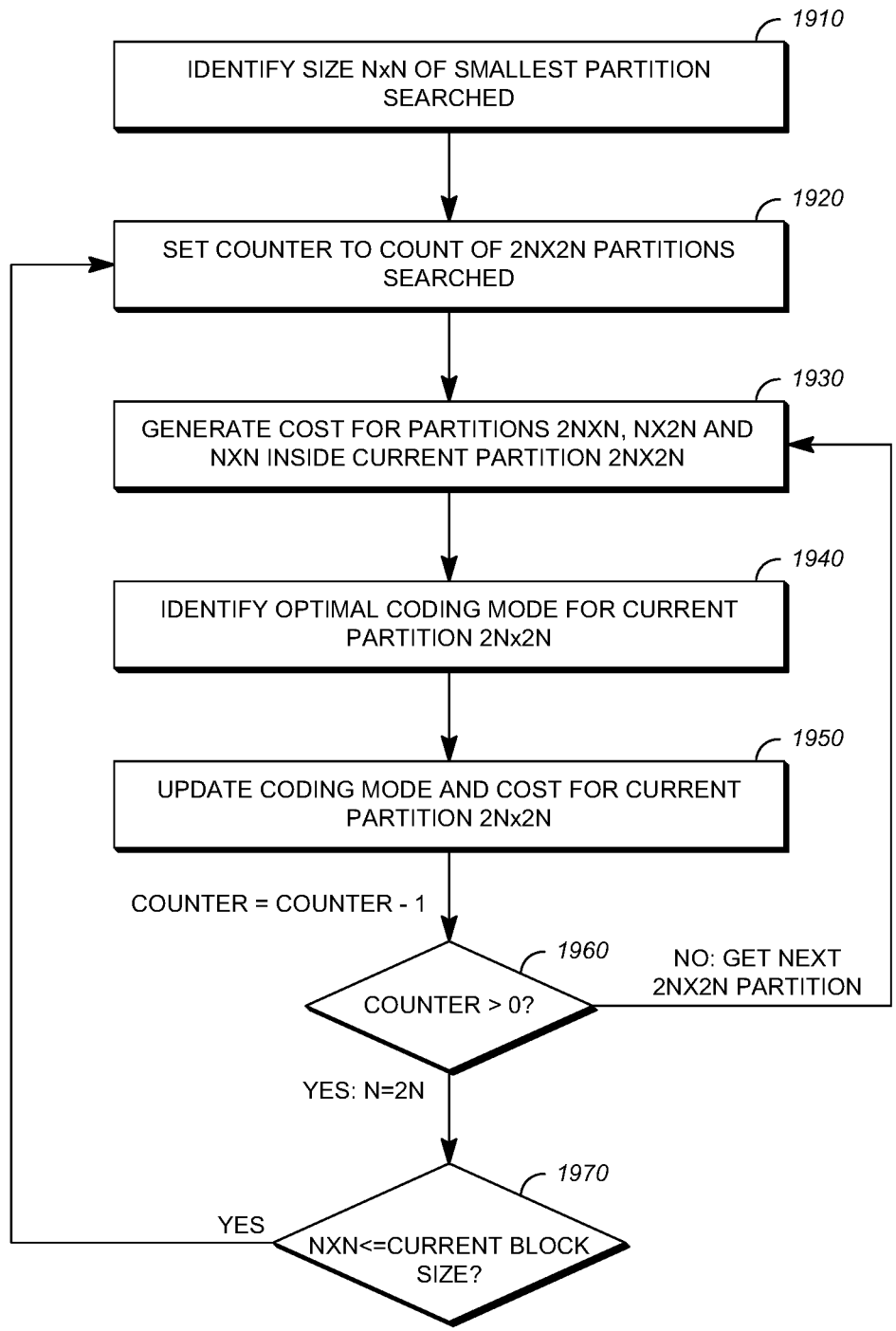
FIG. 19 is a block diagram of an example of coding tree optimization in accordance with implementations of this disclosure.

FIG. 19 is a block diagram of an example of coding tree optimization in accordance with implementations of this disclosure. In some implementations, coding tree optimization may include identifying the size N×N of the smallest partition searched for the current block at 1910, setting a counter to a count of 2N×2N partitions searched for the current block at 1920, generating a penalized cost for each partition in the current 2N×2N partition searched for the current block at 1930, identifying an optimal coding mode for the current 2N×2N partition at 1940, updating the coding mode and cost for the current 2N×2N partition at 1950, determining whether to optimize another 2N×2N partition searched at 1960, determining whether to optimize a larger partition for the current block at 1970, or a combination thereof.

In some implementations, the size N×N of the smallest partition searched for the current block may be identified at 1910. For example, the smallest partition size searched may be 8×8.

In some implementations, the number of 2N×2N partitions searched for the current block may be identified at 1920. In some implementations, identifying the number of partitions searched at 1920 may include setting a counter, such as upper_part_cnt, to indicate the number of 2N×2N partitions searched for the current block. For example, the smallest partition size searched may be 8×8 and the counter may indicate the number of 16×16 partitions searched for the current block. In some implementations, identifying the number of 2N×2N partitions searched for the current block at 1920 may include identifying a 2N×2N partition searched for the current block as the current 2N×2N partition.

In some implementations, a penalized cost for each partition in the current 2N×2N partition searched for the current block may be generated at 1930. For example, for each 2N×2N partition searched for the current block, a 2N×N penalized cost, which may indicate a sum of cost values for two 2N×N partitions of the 2N×2N partition and a 2N×N partitioning penalty, may be generated; a N×2N penalized cost, which may indicate a sum of cost values for two N×2N partitions of the 2N×2N partition and a N×2N partitioning penalty, may be generated; and an N×N penalized cost, which may indicate a sum of cost values for four N×N partitions of the 2N×2N partition and a N×N partitioning penalty, may be generated. In some implementations, the partitioning penalties may indicate a penalty identified for a respective partition size. For example, a relatively large partition penalty may be identified for a relatively small partition size, which may increase compression efficiency.

In some implementations, an optimal coding mode for the 2N×2N partition may be identified at 1940. For example, an optimal coding mode for the 2N×2N partition may be identified as the smallest of the generated penalized costs and the cost value for the 2N×2N partition.

In some implementations, the coding mode and cost for the 2N×2N partition may be updated at 1950. For example, the coding mode and cost value for the 2N×2N partition may be updated to indicate the optimal coding mode and cost value.

In some implementations, whether to optimize another 2N×2N partition for the current block may be determined at 1960. For example, the counter may be decremented, a counter value greater than zero may indicate that another 2N×2N partition may be optimized for the current block, another 2N×2N partition that was searched for the current block may be identified as the current 2N×2N partition, and generating a penalized cost at 1930, identifying an optimal coding mode at 1940, updating the coding mode and cost at 1950, and determining whether to optimize another 2N×2N partition at 1960, may be repeated for the current 2N×2N partition. In another example, the counter may be decremented, and a counter value of zero may indicate that the 2N×2N partitions searched for the current block are optimized, which may indicate an optimal subdivision map for the corresponding subdivision level.

In some implementations, whether to optimize a larger partition for the current block may be determined at 1970. For example, N may be doubled, the doubled N may be less than or equal to the current block size, and setting the counter at 1920, generating a penalized cost at 1930, identifying an optimal coding mode at 1940, updating the coding mode and cost at 1950, determining whether to optimize another 2N×2N partition 1960, and determining whether to optimize a larger partition for the current block at 1970, may be repeated for the larger partition. In another example, N may be doubled, the doubled N may be greater than the current block size, and the optimized partitioning map for the current block may be stored at 1424 as shown in FIG. 14.

In some implementations, generating a penalized cost at 1930, identifying an optimal coding mode at 1940, and updating the coding mode and cost at 1950, may be performed in parallel, substantially simultaneously, for one or more partitions of a subdivision level.

Referring to FIG. 14, in some implementations, resource utilization, such as memory utilization, for the index information for the current frame may be relatively small, such as 1/16 the size of the frame, and block motion estimation at 1420 may include motion searching for multiple reference frames. In some implementations, reference frame candidates may be identified for each block of the current frame. For example, coding tree creation, or a portion thereof, such as the coding optimization shown in FIG. 19, may include identifying reference frame candidates. In some implementations, identifying reference frame candidates may include using reference frame penalty values.

In some implementations, block motion estimation at 1420 may include identifying partition sizes and coding depth based on resolution. For example, block motion estimation for a relatively low resolution frame, such as a frame having a resolution less than 704×576, may include using partition sizes from 32×32 to 8×8, which may include using 41 SAD accumulators. In another example, block motion estimation for a relatively high resolution frame, such as a frame having a resolution greater than or equal to 704×576, may include using partition sizes from 64×64 to 16×16, which may include using 41 SAD accumulators.

In some implementations, block motion estimation at 1420 may include outputting a block motion estimation partition list 1424. For example, the block motion estimation partition list 1424 may include block-resolution motion vectors and dimensions for each partition for the current block. In some implementations, block motion estimation at 1420 may include determining the partitions to include in the block motion estimation partition list 1424. For example, block motion estimation at 1420 may include determining the partitions to include in the block motion estimation partition list 1424 such that each pixel in the current block is represented by a partition in the block motion estimation partition list 1424. For example, the block motion estimation partition list 1424 may include a 64×64 block and an associated block-resolution motion vector, the block motion estimation partition list 1424 may include four 32×32 blocks and four associated motion vectors, the block motion estimation partition list 1424 may include a 32×32 block, two 16×32 blocks, two 32×16 blocks, four 16×16 blocks, and nine associated motion vectors.

In some implementations, pixel motion may be estimated at 1430. For example, pixel motion estimation at 1430 may include pixel domain refinement of the motion estimates for each partition. In some implementations, pixel motion estimation at 1430 may include sub-partitioning the partitions generated by the block motion estimation at 1420. For example, the smallest partition generated by the block motion estimation at 1420 may be a square partition, such as a 16×16 partition, and the pixel motion estimation at 1430 may include processing smaller partitions, such as 16×8 partitions, 8×16 partitions, 8×8 partitions, 8×4 partition, 4×8 partitions, 4×4 partitions, 4×2 partitions, 2×4 partitions, or 2×2 partitions.

Figure 20:
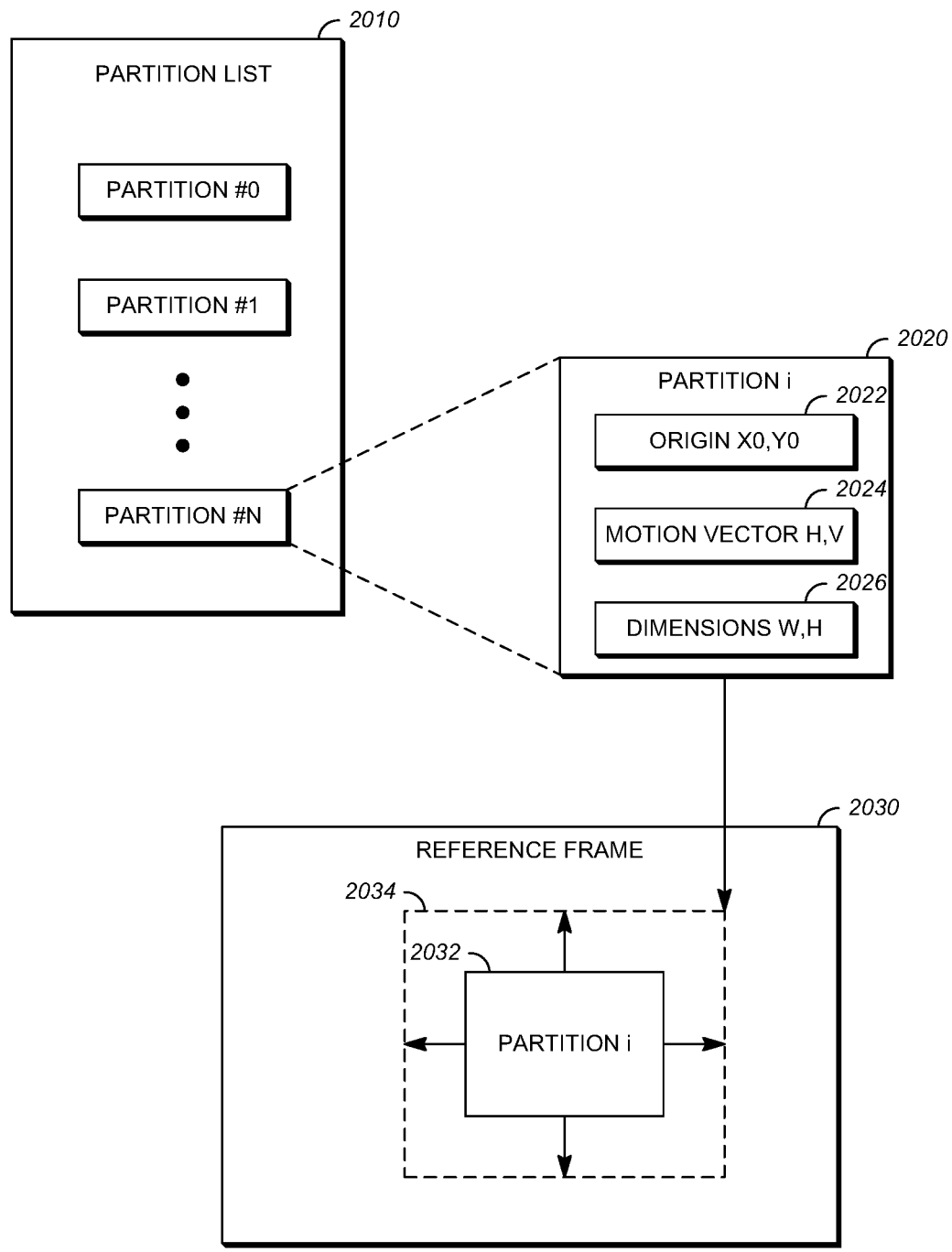
FIG. 20 is a block diagram of an example of pixel motion estimation in accordance with implementations of this disclosure.

FIG. 20 is a block diagram of an example of pixel motion estimation in accordance with implementations of this disclosure. In some implementations, pixel motion estimation, such as the pixel motion estimation shown at 1430 in FIG. 14, may include retrieving a partition list 2010, such as the block motion estimation partition list 1424 in FIG. 14, which may include partition information 2020, such as a partition map, for one or more partitions for searching the current block. For example, the partition information 2020 for each partition may include partition attributes, such as an origin 2022, which may indicate a location of the top left pixel in the partition relative to the frame, a block-resolution motion vector 2024, dimensions 2026, which may indicate a size of the partition, and any other partition information. In some implementations, the partition list 2010 may be based on index information for a reference frame, and pixel motion estimation may include mapping the partition information to the corresponding reference frame 2030. For example, a pixel domain partition 2032 in the reference frame may be identified based on the partition information 2020, such as the origin 2022 and the dimensions 2026, and a pixel-resolution motion vector may be generated based on the partition information 2020, such as the block-resolution motion vector 2024, and a pixel motion estimation search area 2034.

Referring to FIG. 14, in some implementations, pixel motion estimation at 1430 may include generating pixel-resolution motion vectors 1432, generating a pixel motion estimation partition list 1434, or both. For example, pixel motion estimation at 1430 may output a pixel motion estimation partition list 1434, which may be similar to the block motion estimation partition list 1424 output by block motion estimation at 1420. In some implementations, the pixel motion estimation partition list 1434 may include pixel-resolution motion vectors, which may be refined motion vectors relative to corresponding block-resolution motion vectors, and block coordinates. In some implementations, pixel motion estimation at 1430 may include sub-partitioning, and the pixel motion estimation partition list 1432 may include sub-partition information.

In some implementations, advanced motion estimation may include identifying reference pixel data, such as pixel data for the reconstructed reference frame. For example, the reconstructed reference frame may be reconstructed from an entropy coded reference frame, such as the entropy coded reference frame 1414, which may be encoded using lossless encoding, such as the lossless encoding shown in FIG. 7 at 740. In some implementations, the entropy coded reference frame 1414 may be retrieved from external memory 1410, may be reconstructed to generate a reconstructed reference frame, or a portion thereof, and may be cached. For example, a cache controller 1450 may control a frame decompressor 1452 to retrieve the entropy coded reference frame 1414, or a portion thereof, from external memory 1410, to generate a reconstructed reference frame, or a portion thereof, based on the entropy coded reference frame, and to cache the reconstructed reference frame data in a block cache, such as a block cache capable of caching a number S of N×N pixel blocks. For example, block cache may be capable of caching 200 64×64 pixel blocks. In some implementations, the cache block size may be the maximum entropy coding block size, such as 64×64 pixels. In some implementations, the frame decompresssor 1452 may receive the block motion estimation partition list 1424, and the cache controller 1450 may use the block motion estimation partition list 1424 to determine a portion of the reference frame to cache.

In some implementations, pixel motion estimation at 1430 may include determining whether the block cache 1454 includes cached reference pixel data corresponding to the partitions indicated in the block motion estimation partition list 1424. For example, the block cache 1454 may not include cached reference pixel data corresponding to the partitions indicated in the block motion estimation partition list 1424, and pixel motion estimation at 1430 may include caching reference pixel data corresponding to an area including the reference block co-located with the current block. In some implementations, caching the reference pixel data may include sending a cache request indicating the reference pixel data to the cache controller 1450. In some implementations, the caching the corresponding reference pixel data may include retrieving reference pixel data for an area that is larger than the pixel motion search area for the current block. For example, retrieving the corresponding reference pixel data may include retrieving reference pixel data for an area that includes reference pixel data that corresponds to another block of the current frame, such a block in a column to the right of the current block or in a row below the current block. In some implementations, retrieving the corresponding reference pixel data may include retrieving reference pixel data for an area based the block motion vectors for current block.

In some implementations, the cache controller 1450 may determine a probability that reference pixel data will be used for searching a block of the current frame other than the current block, such as a block in a column to the right of the current block or in a row below the current block, and may cache reference pixel data for blocks of the current frame other than the current block, such as reference pixel data having a high probability of being searched for coding the other block. In some implementations, the probability that reference pixel data will be used for searching a block of the current frame other than the current block may be determined based on a median of the motion vectors for a previous block. For example, one or more blocks in an area of the reference frame may be identified for motion estimation of one or more blocks in the current frame, and the area of the frame may be identified as having a high probability of being identified for motion estimation other similarly located blocks in the current frame. In another example, an area of the reference frame corresponding to a motion vector identified for a previously coded block may be identified as having a high probability of being used as a reference block for similarly located blocks in the current frame, and may be buffered.

In some implementations, pixel motion estimation at 1430 may include, for each partition in the block motion estimation partition list 1424, retrieving reference frame pixels for an area including the partition, such as an area 8 pixels larger [+−8, +−8] than the partition, and generating a pixel-resolution motion vector for the respective partition. In some implementations, the pixel-resolution motion vectors may be generated based on SAD values and penalty values. In some implementations, reference frame pixels may be reconstructed for an area 4 pixels larger [+−4, +−4] than the partition. For example, an area 8 pixels larger [+−8, +−8] than the partition may be used for a relatively small resolution, such as a frame having a resolution less than 704×576, and an area 4 pixels larger [+−4, +−4] than the partition may be used for a relatively large resolution such as a frame having a resolution of 704×576 or greater.

In some implementations, pixel motion estimation at 1430 may include sub-partitioning the partitions indicated in the block motion estimation partition list 1424. For example, square partitions indicated in the block motion estimation partition list 1424 may be sub-partitioned, and the SAD accumulators may accumulate SAD values for each sub-partition, which may be similar to accumulating SAD values for the respective partition as described herein at 1420. In some implementations, the SAD accumulator associated with a partition may accumulate values for sub-partitions of the partition. In some implementations, some partition sizes, such as 4×4 partitions, may be omitted. In some implementations, sub-partitioning may optimize the block motion estimation partitioning. For example, the block motion estimation partitioning may include a smallest partition size of N×N pixels, such as 16×16 pixels, and pixel motion estimation sub-partitioning may include a smallest partition size of ½N×½N pixels, such as 8×8 pixels.

In some implementations, pixel motion estimation at 1430 may include identifying the smallest partition size N×N from the block motion estimation partition list 1424, and generating a pixel-resolution motion vector for each N×N prediction unit in the current block. For example, from the block motion estimation partition list 1424 may include a 32×32 pixel partition, two 16×32 pixel partitions, two 32×16 pixel partitions, and four 16×16 pixel partitions, the smallest partition size may be identified as 16×16, and pixel motion estimation at 1430 may include generating a pixel-resolution motion vector for each 16×16 pixel prediction unit in the current block. In some implementations, generating a pixel-resolution motion vector may include refining a corresponding block-resolution motion vector. Table 6 shows an example of a partition map for block motion estimation.

TABLE 6

| MV #0 | MV #1 | MV #2 |
|---|---|---|
| 32 × 32 | 16 × 32 | 16 × 32 |
| MV #3 | MV #5 | MV #6 |
| 32 × 16 | 16 × 16 | 16 × 16 |
| MV #4 | MV #7 | MV #8 |
| 32 × 16 | 16 × 16 | 16 × 16 |

Table 7 shows an example of a partition map for pixel motion estimation based on the block motion estimation partition map shown in Table 6.

TABLE 7

| MV #0 | MV #0 | MV #1 | MV #2 |
|---|---|---|---|
| 16 × 16 | 16 × 16 | 16 × 16 | 16 × 16 |
| MV #0 | MV #0 | MV #1 | MV #2 |
| 16 × 16 | 16 × 16 | 16 × 16 | 16 × 16 |
| MV #3 | MV #3 | MV #5 | MV #6 |
| 16 × 16 | 16 × 16 | 16 × 16 | 16 × 16 |
| MV #4 | MV #4 | MV #7 | MV #8 |
| 16 × 16 | 16 × 16 | 16 × 16 | 16 × 16 |

In some implementations, a pixel-resolution predictor $PPred_C$ for a candidate pixel-resolution motion vector $PMV_C$ may be generated based on the pixel-resolution motion vector for the prediction unit immediately above the current prediction unit and the pixel-resolution motion vector for the prediction unit immediately to the left of the current prediction unit. For example, the pixel-resolution motion vector nearest to the candidate motion vector may be identified as the pixel-resolution predictor for the candidate pixel-resolution motion vector. In some implementations, determining a pixel-resolution motion vector penalty $PPenalty_C$ for a component C may be similar to determining a block-resolution motion vector penalty $BPenalty_C$ for the component C, and may be expressed as the following:

$$PPenalty_C = 140 * \sqrt{|PMV_C - PPred_C|} * DiffPenaltyMultiplier[QP]/160. \text{ (Equation 4)}$$

In some implementations, sub-pixel motion may be estimated at 1440. For example, sub-pixel motion estimation at 1440 may be similar to pixel motion estimation at 1430. In some implementations, sub-pixel motion estimation at 1440 may include receiving the pixel motion estimation partition list 1434, which may include pixel-resolution motion vectors and coordinates. In some implementations, sub-pixel motion estimation at 1440 may include sub-pixel domain refinement of the pixel-resolution motion estimates for each partition.

In some implementations, sub-pixel motion estimation at 1440 may include generating sub-pixel-resolution motion vectors 1442, generating a sub-pixel motion estimation partition list 1444, or both. For example, sub-pixel motion estimation at 1440 may output a sub-pixel motion estimation partition list 1444, which may be similar to the pixel motion estimation partition list 1434 output by pixel motion estimation at 1430. In some implementations, the sub-pixel motion estimation partition list 1444 may include refined motion vectors and block coordinates. In some implementations, sub-pixel motion estimation at 1440 may include sub-partitioning, and the sub-pixel motion estimation partition list 1444 may include sub-partition information.

In some implementations, sub-pixel motion estimation at 1440 may include, for each partition in the pixel motion estimation partition list 1434, interpolating reference frame sub-pixels for an area including the partition, such as an area 1 pixel larger [+−1, +−1] than the partition, and generating a sub-pixel-resolution motion vector for the respective partition for each sub-pixel offset. For example, interpolation filter 1456 may receive the reference frame pixel data and the pixel motion estimation partition list 1434, may generate a filtered area 1458, which may include interpolated sub-pixel data for the search area, and sub-pixel motion estimation at 1440 may include receiving the filtered area 1458 and generating a sub-pixel-resolution motion vector for the respective partition for each sub-pixel offset using the filtered search area 1458.

In some implementations, the sub-pixel-resolution motion vector may be generated based on SAD values and penalty values.

In some implementations, sub-pixel motion estimation at 1440 may include sub-partitioning the partitions indicated in the pixel motion estimation partition list 1434. For example, square partitions indicated in the pixel motion estimation partition list 1434 may be sub-partitioned, and SAD accumulators may accumulate SAD values for each sub-partition, which may be similar to accumulating SAD values for the respective partition as described herein at 1420 and 1430. In some implementations, some partition sizes, such as 4×4 partitions, may be omitted.

In some implementations, sub-pixel motion estimation at 1440 may include identifying the smallest partition size N×N from the pixel motion estimation partition list 1434, and generating a sub-pixel-resolution motion vector for each N×N prediction unit in the current block. For example, from the pixel motion estimation partition list 1434 may include a 32×32 pixel partition, two 16×32 pixel partitions, two 32×16 pixel partitions, and four 16×16 pixel partitions, the smallest partition size may be identified as 16×16, and sub-pixel motion estimation at 1440 may include generating a sub-pixel-resolution motion vector for each 16×16 pixel prediction unit in the current block. In some implementations, generating a sub-pixel-resolution motion vector may include refining a corresponding pixel-resolution motion vector.

In some implementations, determining a sub-pixel-resolution motion vector penalty $SPenalty_C$ for a sub-pixel-resolution motion vector SMV component C $SMV_C$ may be similar to determining a pixel-resolution motion vector penalty $PPenalty_C$ for the component C, may be based on a sub-pixel-resolution predictor $SPred_C$ for a candidate sub-pixel-resolution motion vector $SMV_C$, and may be expressed as the following:

$$SPenalty_C = 10 * \sqrt{|SMV_C - SPred_C|} * DiffPenaltyMultiplier[QP]/160. \text{ (Equation 5)}$$

In some implementations, optimal intra-prediction information for the current block may be identified at 1460, and an encoding mode, such as intra-prediction or inter-prediction, for coding the current block may be determined at 1470. In some implementations, the encoding mode identification at 1470 may receive the sub-pixel motion estimation partition list from the sub-pixel motion estimation at 1440.

In some implementations, the current block may be encoded at 1480. In some implementations, encoding the current block at 1480 may include identifying a residual based on a difference between the current block and a predicted block; transforming and quantizing the residual, which may include using a DCT to generate coefficients and quantizing the coefficients; and outputting the quantized coefficients. In some implementations, encoding the current block at 1480 may include generating a reconstructed block based on the encoded block, which may include generating a decoded residual based on the encoded block, which may include inverse quantizing and inverse transforming the encoded block, generating a reconstructed block by combining the decoded residual and the predicted block, and outputting the reconstructed block to, for example, a reconstructed frame buffer.

In some implementations, the block-resolution motion vectors 1422 may be stored in a first memory, which may be configured for storing the block-resolution motion vectors 1422. In some implementations, the pixel-resolution motion vectors 1432 may be stored in a separate second memory, which may be configured for storing the pixel-resolution motion vectors 1432. In some implementations, the sub-pixel-resolution motion vectors 1442 may be stored in a separate third memory, which may be configured for storing the sub-pixel-resolution motion vectors 1442.

Other implementations of the diagrams of advanced motion estimation as shown in FIGS. 6-20 are available. In implementations, additional elements of advanced motion estimation can be added, certain elements can be combined, and/or certain elements can be removed. For example, sub-partitioning for pixel motion estimation at 1430 may be omitted and the pixel motion estimation partition list may be generated based on the block motion estimation partitions identified at 1420.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. As used herein, the terms "determine" and "identify", or any variations thereof, includes selecting, ascertaining, computing, looking up, receiving, determining, establishing, obtaining, or otherwise identifying or determining in any manner whatsoever using one or more of the devices shown in FIG. 1.

Further, for simplicity of explanation, although the figures and descriptions herein may include sequences or series of steps or stages, elements of the methods disclosed herein can occur in various orders and/or concurrently. Additionally, elements of the methods disclosed herein may occur with other elements not explicitly presented and described herein. Furthermore, not all elements of the methods described herein may be required to implement a method in accordance with the disclosed subject matter.

The implementations of the transmitting station 100A and/or the receiving station 100B (and the algorithms, methods, instructions, etc. stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of the transmitting station 100A and the receiving station 100B do not necessarily have to be implemented in the same manner.

Further, in one implementation, for example, the transmitting station 100A or the receiving station 100B can be implemented using a general purpose computer or general purpose/processor with a computer program that, when executed, carries out any of the respective methods, algorithms and/or instructions described herein. In addition or alternatively, for example, a special purpose computer/processor can be utilized which can contain specialized hardware for carrying out any of the methods, algorithms, or instructions described herein.

The transmitting station 100A and receiving station 100B can, for example, be implemented on computers in a real-time video system. Alternatively, the transmitting station 100A can be implemented on a server and the receiving station 100B can be implemented on a device separate from the server, such as a hand-held communications device. In this instance, the transmitting station 100A can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting station 100A. Other suitable transmitting station 100A and receiving station 100B implementation schemes are available. For example, the receiving station 100B can be a generally stationary personal computer rather than a portable communications device and/or a device including an encoder 400 may also include a decoder 500.

Further, all or a portion of implementations can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described implementations have been described in order to allow easy understanding of the application are not limiting. On the contrary, the application covers various modifications and equivalent arrangements included within the scope of the appended claims, which scope is to be accorded the broadest interpretation so as to encompass all such modifications and equivalent structure as is permitted under the law.

What is claimed is:

1. A method for encoding an input video stream by a processor in response to instructions stored on a non-transitory computer readable medium, the method comprising:
   generating an encoded frame by encoding a first frame from the input video stream, wherein the first frame includes blocks, and wherein encoding the first frame includes:
      identifying a current block from the blocks;
      generating block index information based on the current block;
      generating block motion estimation information based on the block index information and reference frame index information associated with an encoded reconstructed frame;
      generating pixel motion estimation information based on the block motion estimation information and a reconstructed reference frame generated based on the encoded reconstructed frame; and
      generating sub-pixel motion estimation information based on the pixel motion estimation information and interpolated sub-pixel data generated based on the reconstructed reference frame; and
   transmitting or storing the encoded frame.

2. The method of claim 1, wherein the block index information includes a plurality of block index positions, and wherein generating the block motion estimation information includes:
   generating a block motion estimation partition list, comprising:
      identifying a search area including a portion of the reference frame index information, the reference frame index information including a plurality of reference frame index positions, the search area including a search area portion of the plurality of reference frame index positions, the search area portion including a co-located portion of the plurality of reference frame index positions, such that the reference frame index positions included in the co-located portion are spatially concurrent with the plurality of block index positions.

3. The method of claim 1, wherein generating the block motion estimation information includes:
   generating a block motion estimation partition list, comprising:
      identifying a plurality of prediction positions, wherein each prediction position from the plurality of prediction positions is associated with a respective prediction portion of a plurality of reference frame index positions; and
      identifying a partition scheme including a plurality of partitions, wherein each partition from the plurality of partitions indicates a portion of each prediction position from the plurality of prediction positions, such that the partition scheme represents the portion of the reference frame index information included in the portion of a search area associated with a prediction position from the plurality of prediction positions.

4. The method of claim 3, wherein generating the block motion estimation information includes generating a block-resolution motion vector for a partition from the plurality of partitions by generating a sum of absolute differences for the partition for each prediction position from the plurality of prediction positions, each sum of absolute differences including absolute differences between a reference frame index position value of each reference frame index position of the partition portion of the prediction portion of the plurality of reference frame index positions associated with the respective prediction position and an index block position value for a corresponding index block position.

5. The method of claim 4, further comprising:
   determining the index block position value for the index block position, including:
      determining a sum of a luminance value of each pixel in the index block; or
      determining an average of a luminance value of each respective pixel in the index block.

6. The method of claim 1, further comprising:
   retrieving the reference frame index information from an external memory; and
   buffering the reference frame index information in an internal memory.

7. The method of claim 6, wherein the reference frame index information includes interpolated index information corresponding to alternating index positions and skipped positions.

8. The method of claim 1, further comprising:
   generating a predicted reconstructed frame from a reconstructed frame, wherein the reconstructed frame is reconstructed from the first frame encoding, the generating comprising:
      generating a predicted value for a pixel from the reconstructed frame, comprising:
         on a condition that the pixel from the reconstructed frame is a top-left corner pixel of a prediction area, predicting the predicted value based on a co-located pixel value;
         on a condition that the pixel from the reconstructed frame is a top row pixel of a prediction area, predicting the predicted value based on a reconstructed pixel left of the current pixel;
         on a condition that the pixel from the reconstructed frame is a left column pixel of a prediction area, predicting the predicted value based on a reconstructed pixel above the current pixel; and
         on a condition that the pixel from the reconstructed frame is not an edge pixel of a prediction area, predicting the predicted value using a Paeth predictor.

9. The method of claim 8, further comprising:
   generating an encoded reference frame based on the reconstructed frame;
   storing the encoded reference frame in an external memory;
   generating stored data representing the encoded reference frame in the external memory, comprising:
      organizing the stored data for vertical random access;
      organizing the stored data for horizontal random access; or
      organizing the stored data for vertical random access and horizontal random access.

10. The method of claim 1, wherein the current block includes a plurality of pixels, and wherein generating the pixel motion estimation information includes:
    generating a pixel motion estimation partition list, comprising:
       identifying a search area including a portion of the reconstructed reference frame, the reconstructed reference frame including a plurality of reconstructed reference frame pixels, the search area including a search area portion of the plurality of reconstructed reference frame pixels, the search area portion including a co-located portion of the plurality of reconstructed reference frame pixels, such that the reconstructed reference frame pixels included in the co-located portion are spatially concurrent with the plurality of pixels from the current block.

11. The method of claim 1, wherein the current block includes a plurality of pixels, and wherein generating the pixel motion estimation information includes:
    generating a pixel motion estimation partition list, comprising:
       identifying a plurality of prediction positions, wherein each prediction position from the plurality of prediction positions is associated with a respective portion of a search area, such that the plurality of prediction positions represents a portion of reconstructed reference frame pixels included in the search area, wherein each prediction position from the plurality of prediction positions is associated with a respective prediction portion of the reconstructed reference frame pixels.

12. The method of claim 1, wherein the current block includes a plurality of pixels, and wherein generating the pixel motion estimation information includes:
    generating a pixel motion estimation partition list, comprising:
       determining a partition scheme including a plurality of partitions from a block motion prediction list, wherein each partition from the plurality of partitions indicates a portion of each prediction position from a plurality of prediction positions, such that the partition scheme represents the portion of the reconstructed reference frame included in the portion of a search area associated with a prediction position from the plurality of prediction positions, wherein each partition from the plurality of partitions indicates a respective partition portion of the prediction portion of reconstructed reference frame pixels associated with the respective prediction position.

13. The method of claim 1, wherein the current block includes a plurality of pixels, and wherein generating the pixel motion estimation information includes:
    generating a pixel motion estimation partition list, comprising:
       generating a pixel-resolution motion vector for a partition from a plurality of partitions based on a block-resolution motion vector indicated by a block motion estimation prediction list for the partition, by generating a sum of absolute differences for the partition for each prediction position from a plurality of prediction positions, each sum of absolute differences including absolute differences between a reconstructed reference frame pixel value of each reconstructed reference frame pixel of a partition portion of reconstructed reference frame pixels associated with a respective prediction position and a current block pixel value for a corresponding pixel of the current block.

14. The method of claim 1, wherein the current block includes a plurality of current pixels and the reconstructed reference frame includes a plurality of reconstructed reference pixels, and wherein generating the pixel motion estimation information includes:
    generating a sub-pixel motion estimation partition list, comprising:
       generating an interpolated reconstructed reference frame portion including a portion of the plurality of reconstructed reference frame pixels and a plurality of interpolated sub-pixel values generated based on the plurality of reconstructed reference pixels;

identifying a search area including a portion of the interpolated reconstructed reference frame portion, the search area including a co-located portion of the interpolated reconstructed reference frame portion, such that the reconstructed reference frame pixels included in the co-located portion are spatially concurrent with the plurality of pixels from the current block;

determining a partition scheme including a plurality of partitions identified from a pixel motion prediction list; and generating a sub-pixel-resolution motion vector for a partition from the plurality of partitions based on a pixel-resolution motion vector indicated by a pixel motion estimation prediction list for the partition.

15. The method of claim 14, further comprising:
identifying a plurality of prediction positions, wherein each prediction position from the plurality of prediction positions is associated with a respective portion of the search area, such that the plurality of prediction positions represents the portion of the interpolated reconstructed reference frame portion included in the search area, wherein each prediction position from the plurality of prediction positions is associated with a respective prediction portion of the interpolated reconstructed reference frame portion.

16. The method of claim 15, further comprising:
generating a sum of absolute differences for the partition for each prediction position from the plurality of prediction positions, each sum of absolute differences including absolute differences between a reconstructed reference frame sub-pixel value of each interpolated reconstructed reference frame sub-pixel of a partition portion of interpolated reconstructed reference frame sub-pixels associated with the respective prediction position and a current block pixel value for a corresponding pixel of the current block.

17. An encoder, comprising:
a processor; and
a memory, communicatively coupled to the processor, the memory storing a plurality of instructions that cause the processor to:
generate an encoded frame based on a frame, wherein the frame includes a plurality of blocks, wherein generating the encoded frame includes:
identifying a current block from the plurality of blocks;
generating block index information based on the current block;
generating block motion estimation information based on the block index information and reference frame index information associated with an encoded reference frame;
generating pixel motion estimation information based on the block motion estimation information and a reconstructed reference frame; and
generating sub-pixel motion estimation information based on the pixel motion estimation information and interpolated sub-pixel data.

18. A method for encoding an input video stream by a processor in response to instructions stored on a non-transitory computer readable medium, the method comprising:
generating an encoded frame based on a frame of the input video stream, wherein the frame includes blocks, and wherein generating the encoded frame includes:
generating block index information based on a current block,
retrieving reference frame index information associated with an encoded reconstructed frame, and
generating motion estimation information for the current block, wherein generating the motion estimation information comprises:
identifying partitions from the current block, the partitions including at least a first partition having a first partition size and a second partition having a second partition size, wherein the first partition size differs from the second partition size; and
concurrently generating motion estimation information for the first partition and the second partition based on the block index information and the reference frame index information; and
transmitting or storing the encoded frame.

19. The method of claim 18, further comprising:
accumulating sum of absolute difference values for each partition.

20. The method of claim 18, further comprising:
selecting partitions for block-resolution motion estimation based on cost value for each partition based on accumulated sum of absolute difference values;
generating a block motion estimation partition list including the selected partition; and
determining a pixel-resolution motion estimation based on the block motion estimation partition list.

* * * * *